US012659525B2

(12) United States Patent
Ma

(10) Patent No.: US 12,659,525 B2
(45) Date of Patent: Jun. 16, 2026

(54) INTELLIGENT VIDEO PLAYBACK

(71) Applicant: Pinterest, Inc., San Francisco, CA (US)

(72) Inventor: Liang Ma, Belmont, CA (US)

(73) Assignee: Pinterest, Inc., San Francisco, CA (US)

( * ) Notice: Subject to any disclaimer, the term of this patent is extended or adjusted under 35 U.S.C. 154(b) by 274 days.

(21) Appl. No.: 18/605,366

(22) Filed: Mar. 14, 2024

(65) Prior Publication Data

US 2024/0223824 A1     Jul. 4, 2024

Related U.S. Application Data

(62) Division of application No. 17/729,866, filed on Apr. 26, 2022, now Pat. No. 11,968,409.

(51) Int. Cl.
| | |
|---|---|
| *H04N 21/232* | (2011.01) |
| *H04N 21/2387* | (2011.01) |
| *H04N 21/25* | (2011.01) |
| *H04N 21/472* | (2011.01) |

(52) U.S. Cl.
CPC ....... *H04N 21/232* (2013.01); *H04N 21/2387* (2013.01); *H04N 21/251* (2013.01); *H04N 21/472* (2013.01)

(58) Field of Classification Search
CPC ............. H04N 21/232; H04N 21/2387; H04N 21/251; H04N 21/472; H04N 21/4424; H04N 21/4516; H04N 21/4826
See application file for complete search history.

(56) References Cited

U.S. PATENT DOCUMENTS

| | | | |
|---|---|---|---|
| 7,272,180 B2 | 9/2007 | Dambrackas | |
| 8,565,228 B1* | 10/2013 | Howard ................ | H04L 12/283 |
| | | | 370/389 |
| 8,737,817 B1* | 5/2014 | Izo ........................ | G06F 16/632 |
| | | | 386/287 |
| 2014/0373063 A1* | 12/2014 | Funk .................... | H04N 21/432 |
| | | | 725/44 |
| 2022/0012281 A1* | 1/2022 | Katz ..................... | G06F 16/735 |

FOREIGN PATENT DOCUMENTS

WO             2014137870 A1       9/2014

* cited by examiner

*Primary Examiner* — Kunal Langhnoja
(74) *Attorney, Agent, or Firm* — Gustafson IP

(57) ABSTRACT

Described are systems and methods for determining and/or generating a queue of content items to improve the playback experience of the content items for a user. The content items may be obtained by a client device from an online service in response to a query, a request for content items, etc. Relevance rankings and/or scores associated with the content items may be replaced and/or augmented with a playability score, which can represent a quality of the playback experience associated with the content item. The playability score may be aggregated with the relevance and/or user engagement score to determine an overall playback score for each content item. The content items may be ranked, ordered, arranged, and/or presented in accordance with the overall playback scores associated with the content items to facilitate an improved playback experience for a user associated with the client device.

18 Claims, 12 Drawing Sheets

300

500

INTELLIGENT VIDEO PLAYBACK

CROSS REFERENCE TO PRIOR APPLICATIONS

This application is a divisional application of and claims priority to U.S. patent application Ser. No. 17/729,866, filed on Apr. 26, 2022 and entitled "Intelligent Video Playback," which is hereby incorporated by reference herein in its entirety.

BACKGROUND

The amount of accessible content is ever expanding. For example, there are many online services that host and maintain content for their users and subscribers. With the sheer volume of accessible content, it can be difficult for users to find, access, and/or consume relevant content. Further, with the improvements in computing technology, the type, size, content, complexity, etc. of content items has substantially increased. Accordingly, given the size and complexity of certain content items (e.g., high resolution videos, etc.), users may experience a degraded experience when consuming such content items.

DETAILED DESCRIPTION

Figure 1:
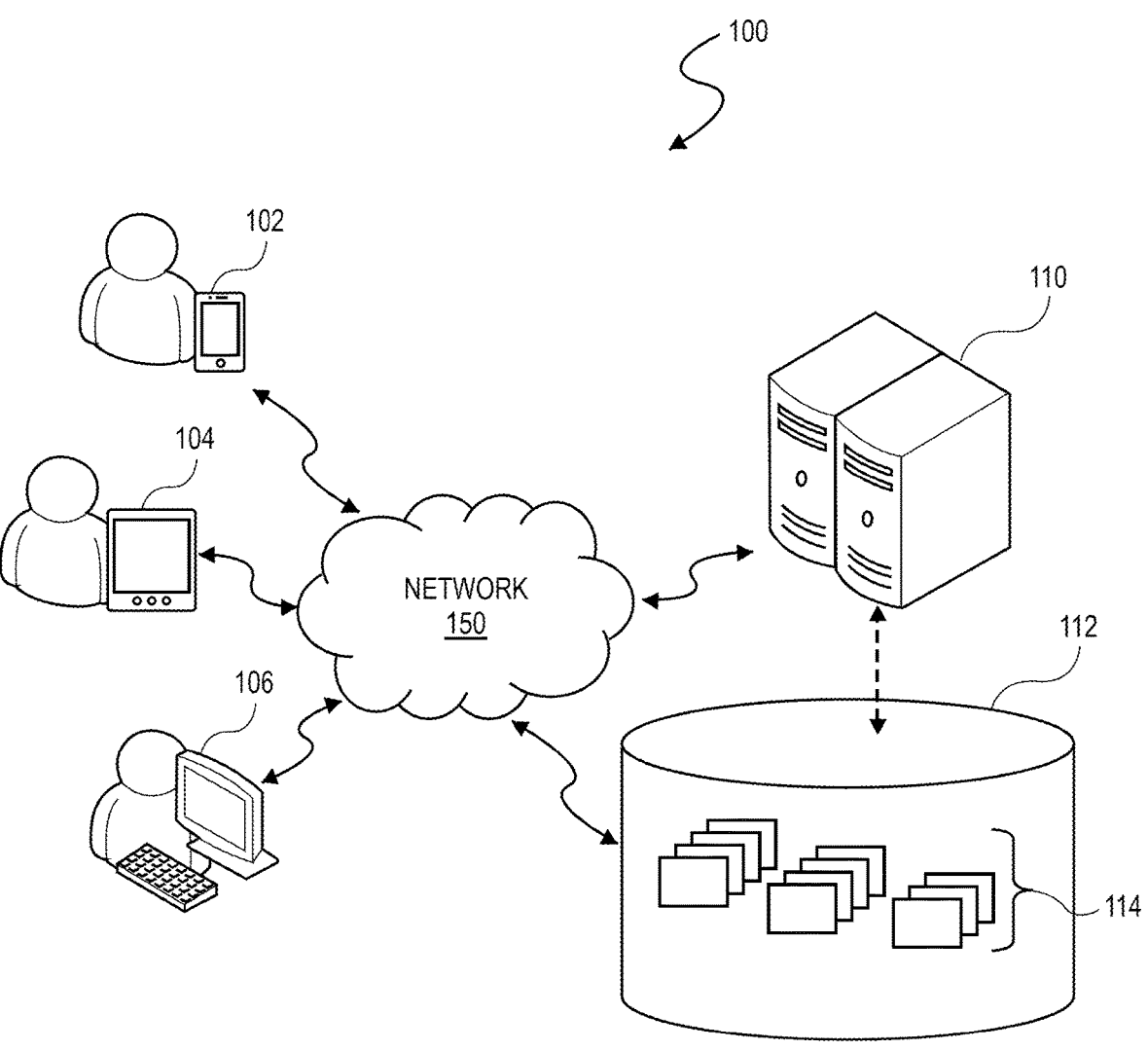
FIG. 1 is an illustration of an exemplary computing environment, according to exemplary embodiments of the present disclosure.

As is set forth in greater detail below, embodiments of the present disclosure are generally directed to systems and methods for determining and/or generating a queue of content items to improve the playback experience of the content items for a user. The content items may be obtained, for example, by a client device from an online service in response to a query, a request for content items, and the like. Alternatively, the online service may push content items to the client device. The content items may have been identified from a corpus of content items and may be obtained by the client device in a ranked and/or ordered list. For example, each content item may be associated with a ranking and/or score that may be representative of a relevance and/or an expected user engagement of each respective content item, and the content items may be ranked and/or ordered in accordance with the respective scores. According to exemplary implementations of the present disclosure, the relevance rankings and/or scores may be replaced and/or augmented with a playability score. For example, certain playback metrics and/or parameters associated with the content items and the client device on which the content items are to be played back may be processed to determine a playability score for each content item. The playability score for each content item may be aggregated with the relevance and/or user engagement score associated with each content item to determine an overall playback score for each content item. The content items may be ranked, ordered, arranged, presented, and/or played in accordance with the overall playback scores associated with the content items to facilitate an improved playback experience for a user associated with the client device.

According to exemplary implementations of the present disclosure, certain playback metrics and parameters may be continuously monitored during playback of the content items. The playback metrics and parameters may be further processed during playback of the content items to facilitate continuous and dynamic updating, adjustment, and/or modification of the overall playback scores for the remaining content items that have not yet been played. Accordingly, during playback of the content items, as the overall playback scores are updated and/or adjusted in view of the playback metrics and parameters, the remaining content items that have not yet been played back may be continuously and dynamically reranked, reordered, rearranged, and/or presented in accordance with the updated and/or adjusted overall playback scores associated with the remaining content items to facilitate a continued improved playback experience for the user associated with the client device.

According to further exemplary implementations of the present disclosure, the overall playback scores, along with certain playback metrics and/or parameters, may be provided to the online service that may have identified and provided the content items to the client device. For example, the online service may employ one or more trained machine learning models in identifying and determining the content items, along with their associated relevance/user engagement scores and/or rankings, from a corpus of content items. Accordingly, the playback metrics and/or parameters and the overall playback scores may be provided to the online service to be used by the online service so that the playback metrics and/or parameters and/or overall playback scores may be considered in determining scores, rankings, etc. for content items that are provided to client devices in response to queries, requests for content items, determinations to push content items, and the like.

FIG. 1 is an illustration of an exemplary computing environment 100, according to exemplary embodiments of the present disclosure.

As shown in FIG. 1, computing environment 100 may include one or more client devices 102, 104, and/or 106, also referred to as user devices, which can allow users to connect over network 150 to access online service 110, which may execute on a network computing system. Online service 110 may include and/or communicate with one or more data store(s) 112, which may be configured to store and maintain a corpus of content items 114, which may include any type of digital content, such as digital images, videos, documents, etc. Online service 110 may form at least a portion of a social media platform or environment, a networking platform or environment, an e-commerce platform or environment, or any other form of interactive computing.

Client devices 102, 104, 106 and/or online service 110 may communicate via wired and/or wireless connections to network 150. Client devices 102, 104, and/or 106 may include any type of computing device, such as a smartphone, tablet, laptop computer, desktop computer, wearable, etc., and network 150 may include any wired or wireless network (e.g., the Internet, cellular, satellite, Bluetooth, Wi-Fi, etc.) that can facilitate communications between client devices 102. 104, and/or 106 and online service 110.

As illustrated in FIG. 1, users associated with client devices 102, 104, and/or 106 may access online service 110 via network 150 to search for, consume, browse, or otherwise access content items, such as content items included in corpus of content items 114. According to embodiments of the present disclosure, client devices 102, 104, and/or 106 may access and/or interact with online service 110 through network 150 via one or more applications operating and/or executing on client devices 102, 104, and/or 106. As shown in FIG. 1, users associated with client devices 102, 104, and/or 106 may launch and/or execute such an application on client devices 102, 104, and/or 106 to access and/or interact with online service 110 through network 150. According to aspects of the present disclosure, a user may, via execution of the application on client devices 102, 104, and/or 106, access or log into online service 110 by submitting one or more credentials (e.g., username/password, biometrics, secure token, etc.) through a user interface presented on client devices 102, 104, and/or 106. The credentials provided by the users may be verified by online service 110. Once logged into online service 110, the user associated with one of client devices 102, 104, and/or 106 may submit a request for content items to online service 110. For example, the request for content items may be included in a query (e.g., a text-based query, an image query, etc.) a request to access a homepage and/or home feed, and the like. Alternatively, online service 110 may push content items to client devices 102, 104, and/or 106. For example, online service 110 may push content items to client devices 102, 104, and/or 106 periodically, after a certain time has elapsed, based on activity of client devices 102, 104, and/or 106 with online service 110, identification of relevant and/or recommended content, and the like.

Accordingly, online service 110 may determine and identify content items (e.g., from corpus of content items 114) that are responsive to the request for content items (e.g., as part of a query, request to access a homepage and/or home feed, or any other request for content items) or a determination that content items are to be pushed to client devices 102, 104, and/or 106. In exemplary implementations, online service 110 may include a search and/or recommendation service configured to identify and/or determine content items from the corpus of content items 114 in response to any such request for content items or determination to push content items. For example, the search and/or recommendation service of online service 110 may include one or more deep neural networks ("DNN"), or other machine learning models, that have been trained to determine and/or identify, as well as score and/or rank (e.g., based on relevance, an expected user engagement, similarity, etc. of the respective content items), content items from the corpus of content items 114 in response to a request for content items from one or more of client devices 102, 104, and/or 106.

In an exemplary implementation where a user associated with client devices 102, 104, and/or 106 sends to online service 110 a request for content items (e.g., via a query, request for homepage and/or home feed content items, etc.), online service 110 may determine, from corpus of content items 114, one or more content items to be presented on one or more of client devices 102, 104, and/or 106 in response to the request. Additionally, online service 110 may determine, based on an expected relevance, user engagement, a similarity to the user's interests and/or activity history, and the like, rankings and/or scores for the identified content items. The scores may be associated with the identified content items, and the identified content items may be arranged and/or ordered in accordance with the scores and/or rankings.

According to exemplary embodiments of the present disclosure, the content items may be determined, identified, scored, and/or ranked based on embedding vectors associated with the content items, which may be representative of and associated with respective content items of corpus of content items 114. For example, a Locality Sensitive Hashing (LSH) technique can be used to process embedding vectors associated with content items of the corpus of content items 114 into an embedding space and divide the corpus into a plurality of regions or "buckets." The request for content items (e.g., the query, the user's interests/profile, etc.) can also be represented as an embedding vector, which can be mapped to one or more of the buckets, which generally may include the content times that are most likely to be similar to the request for content items, as determined by their projected proximity in the multi-item embedding space (e.g., cosine similarity, etc.). Alternatively, online service 110 may push content items to client devices 102, 104, and/or 106.

Accordingly, the content items, as well as content item information associated with the content items identified by online service 110, may be provided to one or more of client devices 102, 104, and/or 106. The content item information may include metadata and information associated with the content items, such as the determined scores and/or rankings, a content item type (e.g., MPEG-4, MOV format, WMV format, AVI format, etc.), a video frame rate, a video resolution, a video length, a video compression, a source/ location identifier (e.g., URL, identification of CDN, etc.), and the like. In addition to the content item information, information associated with one or more of client devices 102, 104, and/or 106 that may be consuming the content items may also be obtained. The client device information may include, for example, information such as a type of device, an operating system of the device, a processor type of the device, a processor usage, a memory usage, a connection type (e.g., gigabit ethernet, 3G, LTE, 5G, etc.), a battery status (e.g., percentage remaining, low power mode, etc.), and the like. The content item information and the client device information may be collectively referred to herein as playback parameters.

The playback parameters associated with the identified content items and client devices 102, 104, and/or 106 may be processed to determine a playability score for each identified content item. The playability score may represent a quality of playback experience associated with each content item on a certain client device (e.g., client device 102, 104, or 106) at a specific point in time in view of the various playback parameters. For example, the network type, available bandwidth, processing power, memory usage, battery status, a content item type, a video frame rate, a video resolution, a video length, a video compression, a source/ location identifier, and the like, may be processed to determine relative playability scores for each of the identified content items.

According to certain aspects of the present disclosure, the playability scores may be aggregated with the relevance and/or user engagement scores determined by online service 110 (e.g., as a normalized weight to the relevance and/or user engagement scores, applying to content items that are associated with a relevance and/or user engagement score that is above a threshold value, etc.) to determine an overall playback score for each content item. Accordingly, the content items may be ordered and presented to a user on client devices 102, 104, and/or 106 (e.g., in a queue, etc.) in accordance with the overall playback scores such that the content item with the highest relative overall playback score may be presented (and played) first. According to certain exemplary implementations, playback of the first content item (e.g., the content item with the highest relative overall playback score) may be automatically initiated.

According to exemplary implementations, the quality of the playback experience may consider, for example, time to load, video quality of the content item, anticipated buffering delays, and the like, with the goal of providing an improved video playback experience to the user (e.g., reduce delays in loading, ensure high quality video playback, etc.), and, in determining the playability scores, the playback parameters may be processed to ensure an improved video playback experience to the user. For example, if the playback parameters indicate that the network type is a slower network with limited bandwidth, a smaller, lower resolution, and/or shorter video content item may be assigned a higher relative playability score. In another example, if the playback parameters indicate that the network is fast, and loading and playback of each of the content items (regardless of the parameters associated with the content items) would be comparable, each of the content items may be assigned a similar playability score such that the order of playback may be substantially in accordance with the relevance and/or user engagement scores determined by online service 110. By way of another example, a higher relative playability score may be assigned to content items that are obtained from a content delivery network (CDN) that may have faster transmission speeds, be geographically closer to the respective client device, and the like. According to an aspect of the present disclosure, if processing of the playback parameters indicates that a certain content item may be substantially unplayable (e.g., a playability score under a threshold value, etc.), the content item in question may be removed from the identified content items such that the user does not experience playback difficulties with the content item in question. Embodiments of the present disclosure may employ, for example, a probabilistic model, a rule-based algorithm, a trained machine learning system, or any combination thereof, in determining the playability scores for each of the content items.

Additionally, according to exemplary implementations of the present disclosure, the playback parameters, as well as certain playback metrics, may be continuously monitored during playback of the content items and after the playability scores were initially determined for the content items. The playback metrics may include, for example, a time to load and/or initiate playback, an error rate associated with the content items, and the like. Accordingly, the playback metrics and playback parameters may be further processed during playback of the content items to facilitate continuous and dynamic updating, adjustment, and/or modification of the overall playback scores for the remaining content items that have not yet been played. Further, as the overall playback scores are updated and/or adjusted in view of the playback metrics and parameters, the overall playback scores of the remaining content items may be continuously and dynamically aggregated with the relevance and/or user engagement scores so that the content items may be reranked, reordered, rearranged, removed, and/or presented in accordance with the updated and/or adjusted playability scores to facilitate a continued improved playback experience for the user associated with the client device. Embodiments of the present disclosure may employ, for example, a probabilistic model, a rule-based algorithm, a trained machine learning system, or any combination thereof, in determining the updated playability scores for each of the content items. The improved playback experience facilitated by ordering the content items based at least in part on the overall playback score may have particular relevance in implementations where video content items are presented in a feed to the user and the user may be quickly scrolling through the video content items.

According to further exemplary implementations of the present disclosure, the overall playback scores, along with certain playback metrics and playback parameters, for the content items may be provided to online service 110. The playback metrics and/or parameters and the overall playback scores may be provided to online service 110 to be used as a further input and/or training input data for one or more machine learning models, that may be employed by online service 110 to determine and/or identify content items from the corpus of content items 114 in response to a request for content items from one or more of client devices 102, 104, and/or 106 or a determination to push content items to one or more of client devices 102, 104, and/or 106. Accordingly, online service 110 may consider the playback metrics, the playback parameters, and/or the overall playback scores in determining the rankings and/or relevance/user engagement scores for the identified content items in response to a request for content items from one or more of client devices 102, 104, and/or 106 or a determination to push content items to one or more of client devices 102, 104, and/or 106.

Figure 2:
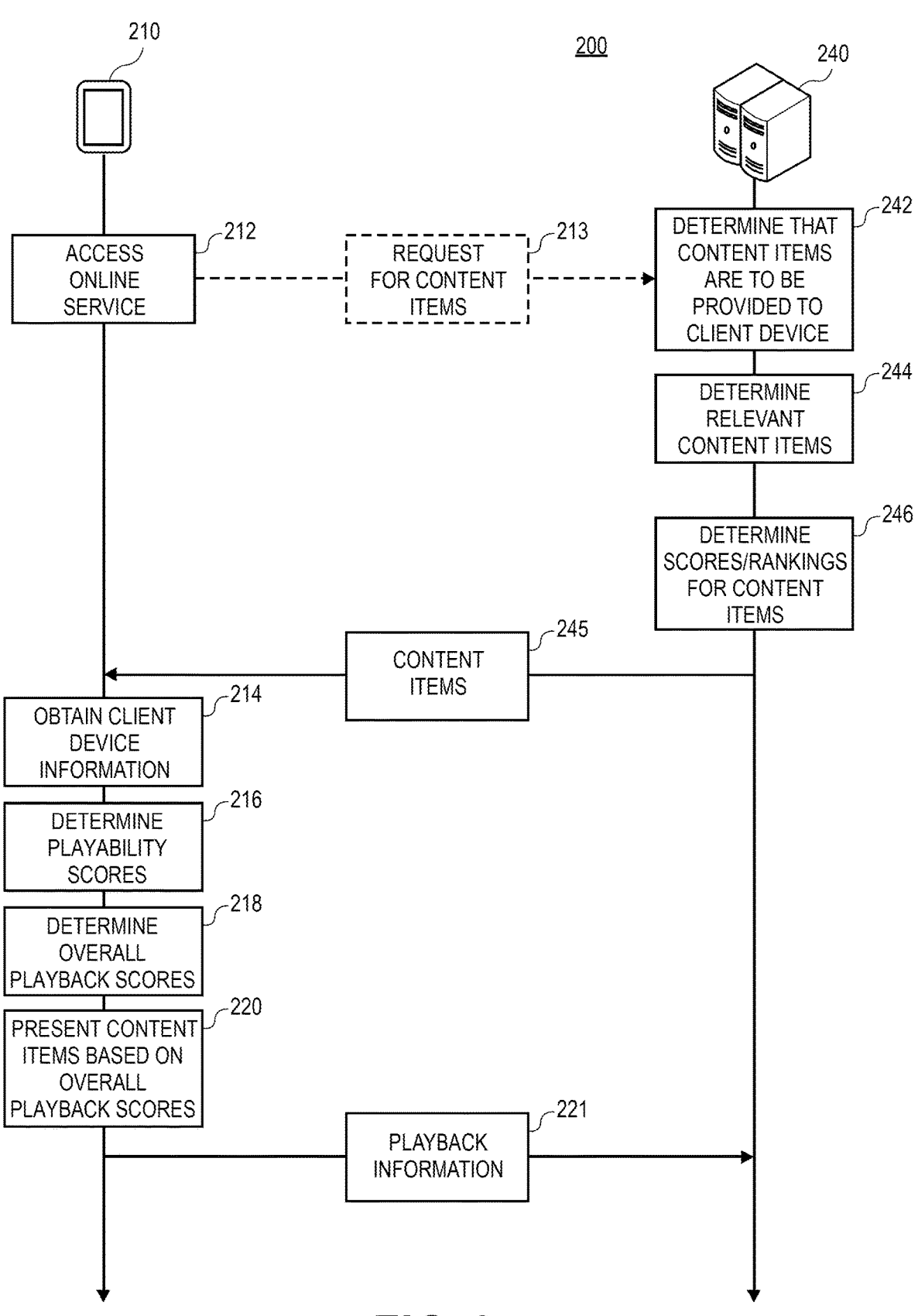
FIG. 2 is a block diagram illustrating an exemplary interaction between a client device and an online service, according to exemplary embodiments of the present disclosure.

FIG. 2 is a block diagram illustrating an exemplary interaction between a client device and an online service, according to exemplary embodiments of the present disclosure.

FIG. 2 illustrates an exemplary interaction 200 between client device 210 and online service 240, according to exemplary embodiments of the present disclosure. Client device 210 may include any of client devices 102, 104, or 106, and online service 240 may include online service 110. Online service 240 may execute on a network computing system and an application may execute and/or operate on client device 210 to access and/or otherwise interact with online service 240.

As shown in FIG. 2, client device 210 may access online service 240 (e.g., block 212) and online service 240 may determine that content items are to be provided to client device 210 (e.g., block 242). For example, the determination that content items are to be provided to client device 210 may be in response to a request for content items (e.g., block 213) and/or a determination that content items are to be pushed to client device 210. Accessing online service 240 may include, for example, logging in to online service 240 to access a home page and/or home feed associated with and presented by online service 240, submitting a query (e.g., a text-based query, an image query, etc.) to online service 240, and the like. Accordingly, accessing the home page and/or submitting a query may include a request for content items to online service 240.

In response to the determination to provide content items to client device 210, online service 240 may determine and identify content items (e.g., from corpus of content items 114) that are responsive to the request for content items 213 (e.g., in response to a query, content items to present on a home page, or content items that are responsive to any other request for content items) or determination that content items are to be provided to client device 210 for presentation on client device 210. In exemplary implementations, online service 240 may include a search and/or recommendation service configured to identify and/or determine relevant and/or responsive content items (e.g., block 244) from a corpus of content items (e.g., corpus of content items 114) in response to a request for content items 213 or a determination that content items are to be provided to client device 210. For example, the search and/or recommendation service of online service 240 may include one or more machine learning models, that have been trained to determine and/or identify content items from a corpus of content items in response to a query, request for content items, and like.

In addition to identifying/determining relevant content items and/or as part of identifying/determining relevant content items, online service 240 may determine scores and/or rankings for each of the determined/identified content items. For example, online service 240 may determine, based on an expected relevance, user engagement, a similarity of the content items, and the like, rankings and/or scores for the identified content items (e.g., block 246). The rankings and/or scores may be associated with the identified content items, and the identified content items, as well as the associated scores and/or rankings, may be determined based on the processing of embedding vectors which may be representative of and associated with respective content items of the corpus of content items.

Accordingly, the content items, as well as content item information associated with the content items identified by online service 240, may be provided to client device 210 (e.g., block 245). The content item information may include metadata and information associated with the content items, such as the determined scores and/or rankings, a content item type, a video frame rate, a video resolution, a video length, a video compression, a source/location identifier, and the like. In addition to the content item information, information associated client device 210 may also be obtained (e.g., block 214). The client device information may include, for example, information such as a type of device, an operating system of the device, a processor type of the device, a processor usage, a memory usage, a connection type (e.g., gigabit ethernet, 3G, LTE, 5G, etc.), a battery status, and the like.

The playback parameters associated with the identified content items and client device 210 may be processed to determine a playability score for each identified content item (e.g., block 216) on client device 210. For example, the network type, available bandwidth, processing power, memory usage, battery status, a content item type, a video frame rate, a video resolution, a video length, a video compression, a source/location identifier, and the like, may be processed to determine relative playability scores for each of the identified content items. The playability scores may represent a relative quality of the playback experience for each content item on client device 210 in view of the various playback parameters and may be aggregated with the relevance and/or user engagement scores determined by online service 240 (e.g., as a normalized weight to the relevance and/or user engagement scores, etc.) to determine an overall playback score for each content item (e.g., block 218). Accordingly, the content items may be ordered and presented to a user on client device 210 in a queue in accordance with each respective overall playback score such that the content item with the highest relative overall playback score may be presented first (e.g., block 220). Further, playback of the first content item (e.g., the content item with the highest relative overall playback score) may be automatically initiated. The improved playback experience facilitated by embodiments of the present disclosure may have particular relevance in implementations where video content items are presented in a feed to the user and the user may be quickly scrolling through the video content items. According to exemplary implementations, the quality of the playback experience may consider, for example, time to load, video quality of the content item, anticipated buffering delays, and the like, with the goal of providing an improved video playback experience to the user (e.g., reduce delays in loading, ensure high quality video playback, etc.). Accordingly, the playback parameters may be processed to ensure an improved video playback experience to the user. Embodiments of the present disclosure may employ, for example, a probabilistic model, a rule-based algorithm, a trained machine learning system, or any combination thereof, in determining the playability scores for each of the content items.

Additionally, according to exemplary implementations of the present disclosure, the playback parameters, as well as certain playback metrics, may be continuously monitored during playback of the content items and after the playability scores were initially determined for the content items. The playback metrics may include, for example, a time to load and/or initiate playback, an error rate associated with the content items, and the like. Accordingly, the playback metrics and playback parameters may be further processed during playback of the content items to facilitate continuous and dynamic updating, adjustment, and/or modification of the overall playback scores for the remaining content items that have not yet been played. Further, as the overall playback scores are updated and/or adjusted in view of the playback metrics and parameters, the overall playback scores of the remaining content items may be continuously and dynamically aggregated with the relevance and/or user engagement scores so that the content items may be reranked, reordered, rearranged, removed, and/or presented in accordance with the updated and/or adjusted playability scores to facilitate a continued improved playback experience for the user associated with the client device. Embodiments of the present disclosure may employ, for example, a probabilistic model, a rule-based algorithm, a trained machine learning system, or any combination thereof, in determining the updated playability scores for each of the content items.

According to further exemplary implementations of the present disclosure, certain playback information, such as the overall playback scores, along with certain playback metrics and playback parameters for the content items may be provided to online service 240 (e.g., block 221). The playback metrics and/or parameters and the overall playback scores may be provided to online service 240 to be used as a further input and/or training input data for one or more machine learning models, that may be employed by online service 240 to determine and/or identify content items from the corpus of content items in response to a query, request for content items, and the like, from one or more client devices. Accordingly, online service 240 may consider the playback information in determining the rankings and/or relevance/user engagement scores for the identified content items in response to a request for content items and/or a determination that content items are to be provided to one or more client devices.

Figure 3A:
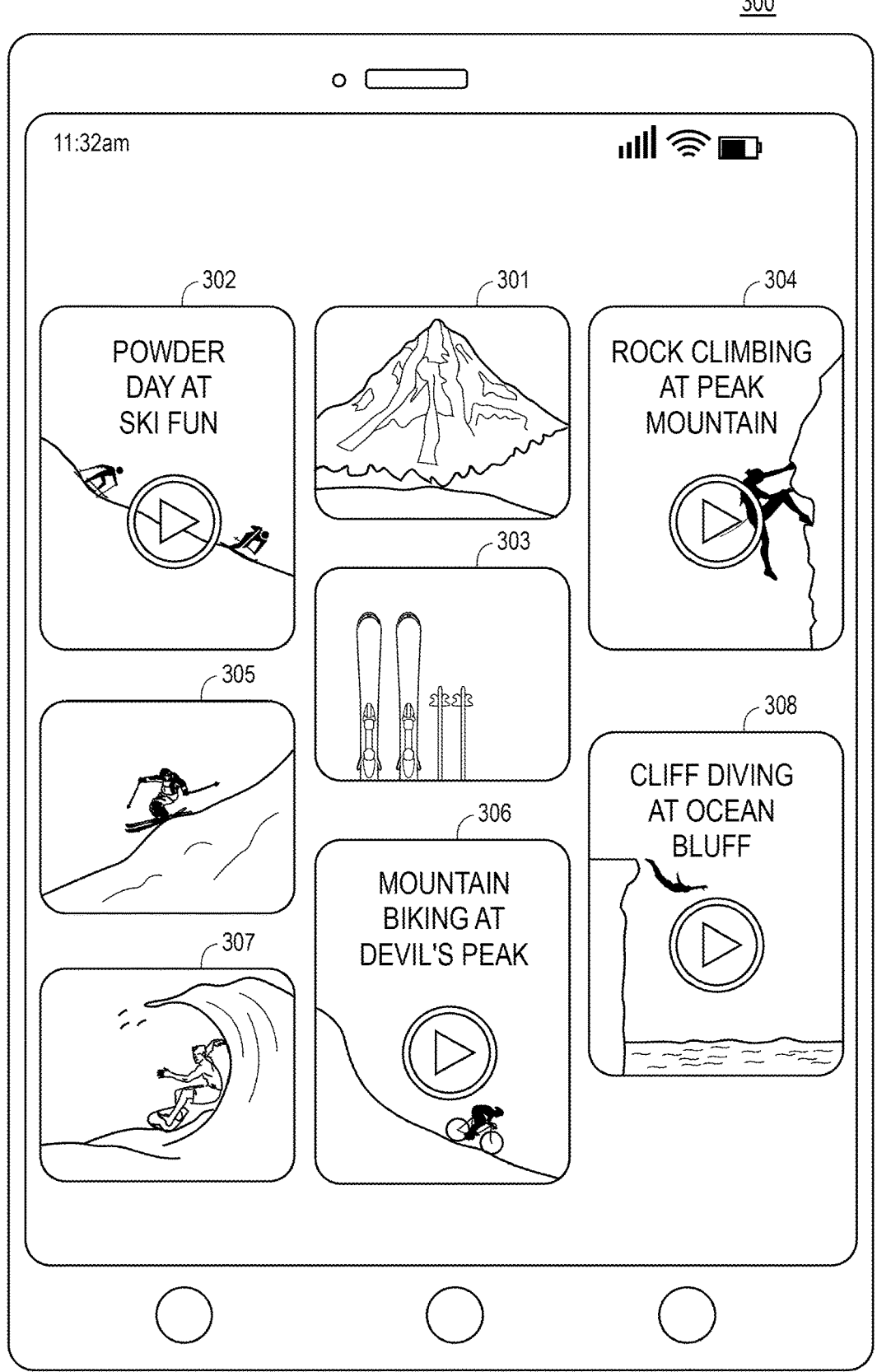
FIGS. 3A-3C are illustrations of exemplary user interfaces that may be presented on a client device, according to exemplary embodiments of the present disclosure.
Figure 3B:
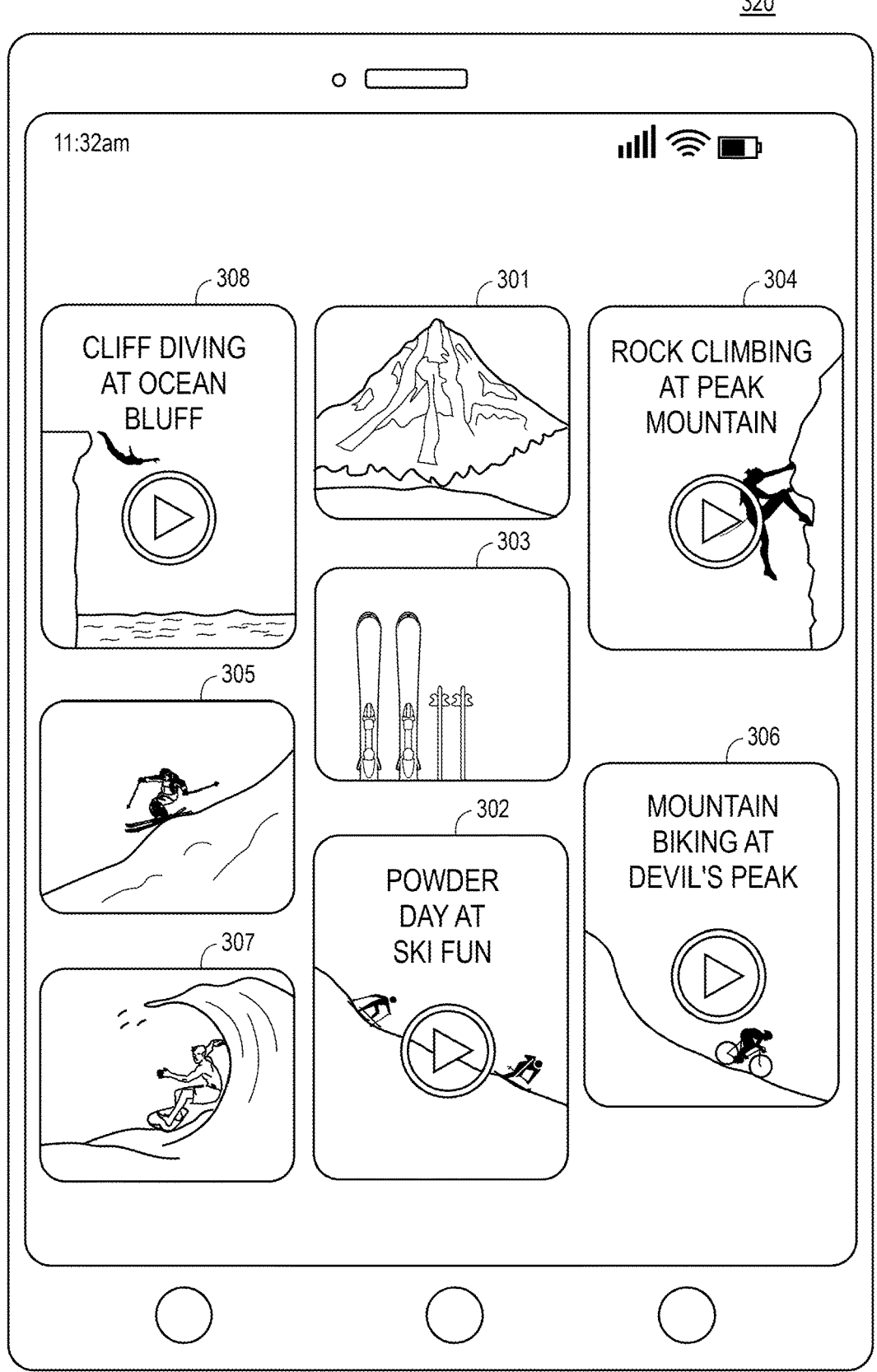
Figure 3C:
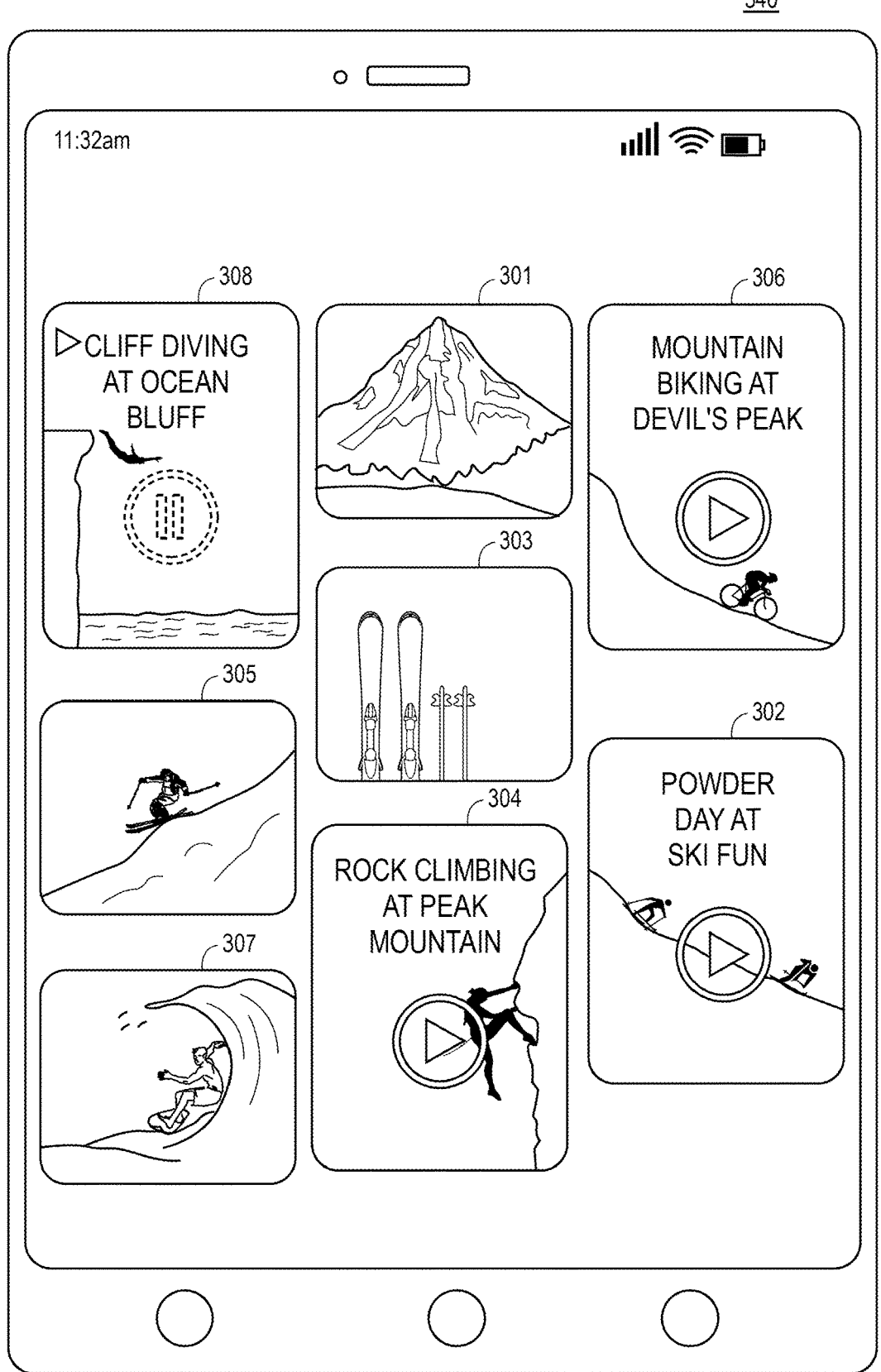

FIGS. 3A-3C are illustrations of exemplary user interfaces that may be presented on a client device, according to exemplary embodiments of the present disclosure.

FIG. 3A is an illustration of exemplary user interface 300 presented on a display of a client device (e.g., client device 102, 104, 106, and/or 210) displaying one or more content items 301, 302, 303, 304, 305, 306, 307, and 308. As shown in FIG. 3A, content items 301, 302, 303, 304, 305, 306, 307, and 308 may be presented on a display of a client device in response to a request for content items and/or a determination that content items are to be provided (e.g., pushed) to a client device. For example, user interface 300 may be presented on the client device in response to a search or query, as part of a home page feed, and the like. Content items 302, 304, 306, and 308 may include video content items and content items 301, 303, 305, and 307 may include static (e.g., non-video) content items, such as images. Accordingly, content items 301, 302, 303, 304, 305, 306, 307, and 308 may have been determined and identified from a corpus of content items by an online service (e.g., online service 110 and/or 240) in response to a request for content items and/or a determination that content items are to be provided (e.g., pushed) to a client device. Further, the online service may provide a template indicating a positioning of static content items and video content items within user interface 300.

In the exemplary implementation illustrated in FIG. 3A, the client device may launch, execute, and/or operate an application facilitating access to an online service. Accordingly, a request for content items may have been sent to the online service (e.g., as part of a query, as part of a request to display a home page, and the like). Alternatively, the online service may have determined that content items are to be otherwise pushed and/or provided to the client device. In response, the online service may have determined and identified content items 301, 302, 303, 304, 305, 306, 307, and 308 (e.g., from a corpus of content items). For example, the online service may include a search and/or recommendation service, which may employ one or more machine learning models, which may be trained and/or configured to identify and/or determine content items from a corpus of content items in response to any such request for content items and/or a determination that content items are to be provided (e.g., pushed) to a client device.

In addition to identifying/determining relevant content items and/or as part of identifying/determining relevant content items, the online service may determine scores and/or rankings for each of content items 301, 302, 303, 304, 305, 306, 307, and 308. For example, the online service may determine, based on an expected relevance, user engagement, and the like, rankings and/or scores for content items 301, 302, 303, 304, 305, 306, 307, and 308. The rankings and/or scores may be associated with each respective content item 301, 302, 303, 304, 305, 306, 307, and 308, and the identified content items may be determined based on the processing of embedding vectors which may be representative of and associated with respective content items of the corpus of content items. According to certain aspects, user interface 300 shown in FIG. 3A may illustrate an implementation where content items 301, 302, 303, 304, 305, 306, 307, and 308 are presented in accordance with the rankings and/or scores determined by the online service.

Additionally, each of video content items 302, 304, 306, and 308 may include certain content item metadata and/or information, such as a content item type, a video frame rate, a video resolution, a video length, a video compression, a source/location identifier, and the like. Accordingly, the content item metadata and/or information associated with each video content item 302, 304, 306, and 308 may specify certain parameters and/or characteristics that may affect a playback experience associated with the content item. Content items 301, 303, 305, and 307 may not include such metadata and/or information, as content items 301, 303, 305, and 307 are static content items (e.g., images). Accordingly, such static content items may be presented in accordance with the rankings and/or scores determined by the online service.

In addition to the content item metadata and/or information, information associated with the client device on which content items 302, 304, 306, and 308 may be played back may also be obtained. The client device information may include, for example, information such as a type of device, an operating system of the device, a processor type of the device, a processor usage, a memory usage, a connection type (e.g., gigabit ethernet, 3G, LTE, 5G, etc.), a battery status, and the like. The content item information and the client device information may collectively be referred to as playback parameters.

According to exemplary implementations of the present disclosure, the playback parameters associated with content items 302, 304, 306, and 308 and the client device on which content items 302, 304, 306, and 308 may be played back may be processed to determine a playability score for each content item 302, 304, 306, and 308. For example, the network type, available bandwidth, processing power, memory usage, battery status, a content item type, a video frame rate, a video resolution, a video length, a video compression, a source/location identifier, and the like, may be processed to determine relative playability scores for each of the identified content items. The playability scores may represent a relative quality of the playback experience for each content item 302, 304, 306, and 308 on the client device in view of the various playback parameters. The playability scores may be aggregated (e.g., as a normalized weight, etc.) with the relevance and/or user engagement scores associated with content items 302, 304, 306, and 308 (and determined by the online service) to determine an overall playback score for each content item 302, 304, 306, and 308.

Accordingly, in the exemplary implementation illustrated in FIG. 3A, content items 302, 304, 306, and 308 may be ordered and presented in user interface 300 in accordance with the overall playback scores. The order in which content items 302, 304, 306, and 308 are presented to a user on the client device may specify an order in which content items 302, 304, 306, and 308 may be played back to the user. As shown in FIG. 3A, content item 302 may be associated with the highest relative overall playback score, and therefore may be presented in an upper left position within user interface 300. After content item 302, content item 304 may have the next highest score, and therefore positioned in the upper right position which may correspond to the second position, and so on. Alternatively, content items 302, 304, 306, and 308 may be presented in other formats (e.g., an ordered list, etc.) in accordance with the overall playback scores.

According to exemplary implementations, the quality of the playback experience may consider, for example, time to load, video quality of the content item, anticipated buffering delays, and the like, with the goal of providing an improved video playback experience to the user (e.g., reduce delays in loading, ensure high quality video playback, etc.). Accordingly, the playback parameters may be processed to ensure an improved video playback experience to the user.

As noted above, FIG. 3A may illustrate an exemplary implementation where the online service had scored and/or ranked content items 301, 302, 303, 304, 305, 306, 307, and 308 such that content item 302 had the highest relative relevance and/or user engagement score, followed by content item 301, followed by content item 304, followed by content item 305, followed by content item 303, followed by content item 307, followed by content item 306, and followed by content item 308. In exemplary implementations where FIG. 3A represents content items 301, 302, 303, 304, 305, 306, 307, and 308 being presented in accordance of overall playback scores, FIG. 3A may illustrate an implementation where processing of the playback parameters associated with content items 302, 304, 306, and 308 resulted in a comparable playback experience for each of content items 302, 304, 306, and 308 (e.g., the network is fast, the client device has ample battery power, processing power, and the like), thereby resulting in similar playability scores such that the order of playback may be substantially the same as the relevance and/or user engagement scores/rankings determined by the online service.

FIG. 3B is an illustration of exemplary user interface 320 presented on a display of a client device (e.g., client device 102, 104, 106, and/or 210) presenting one or more content items 301, 302, 303, 304, 305, 306, 307, and 308. User interface 320 shown in FIG. 3B is substantially similar to user interface 300 shown in FIG. 3A and also illustrates user interface 320 presenting content items 301, 302, 303, 304, 305, 306, 307, and 308 on a display of a client device. For example, user interface 320 may be presented on the client device in response to a search or query, as part of a home page feed, a determination that content items are to be provided (e.g., pushed) to a client device, and the like. Accordingly, content items 301, 302, 303, 304, 305, 306, 307, and 308 may have been determined and identified from a corpus of content items by an online service (e.g., online service 110 and/or 240) and provided to the client device.

However, compared to the implementation shown in FIG. 3A, in the exemplary implementation illustrated in FIG. 3B, the order and presentation of content items 302, 304, 306, and 308 may be different, thereby specifying a different order in which content items 302, 304, 306, and 308 may be played back to the user based on the overall playback scores determined for content items 302, 304, 306, and 308. However, the order of content items 301, 303, 305, and 307 may remain the same as the order in which they are presented in FIG. 3A (as they are static content items that may be presented in accordance with the rankings and/or scores determined by the online service). As shown in FIG. 3B, content item 308 may be associated with the highest relative overall playback score, and therefore may be presented in an upper left position within user interface 320. After content item 308, content item 304 may have the next highest score, and therefore positioned in the upper right position which may correspond to the second position, and so on.

Compared to the implementation illustrated in FIG. 3A, FIG. 3B may illustrate an exemplary implementation where the playback parameters indicate that playing back content items 302, 304, 306, and 308 in the arranged, presented order in user interface 320 (e.g., content item 308, followed by content item 304, followed by content item 302, followed by content item 306) may improve the playback experience for the user. Continuing the example described in connection with FIG. 3A where the online service had scored and/or ranked content items 301, 302, 303, 304, 305, 306, 307, and 308 such that content item 302 had the highest relative relevance and/or user engagement score, followed by content item 301, followed by content item 304, followed by content item 305, followed by content item 303, followed by content item 307, followed by content item 306, and followed by content item 308, as shown in FIG. 3B, user interface 320 presents content item 308 first, followed by content item 301, followed by content item 304, followed by content item 305, followed by content item 303, followed by content item 307, followed by content item 302, followed by content item 306, which is not the same order as the scores and/or rankings determined by the online service. Accordingly, the exemplary implementation illustrated in FIG. 3B may include a scenario where processing of the playback parameters results in playability scores that yields a different ordering of video content items 302, 304, 306, and 308 (while the ordering of content items 301, 303, 305, and 307 may remain the same), i.e., where the highest overall playback score is associated with content item 308, followed by content item 304, followed by content item 302, followed by content item 306. For example, it may have been determined that content item 308 may have the fastest time to play in view of the playback parameters, and the like, while still considering the relevance and/or user engagement scores determined by the online service.

FIG. 3C is an illustration of exemplary user interface 340 presented on a display of a client device (e.g., client device 102, 104, 106, and/or 210) presenting one or more content items 301, 302, 303, 304, 305, 306, 307, and 308. User interface 340 illustrated in FIG. 3C may display a point in time after user interface 320 shown in FIG. 3B. Accordingly, FIG. 3C illustrates an exemplary implementation where content item 308 is currently being played back to the user (as indicated by the "pause" symbol rather than the "play" symbol included in content items 302, 304, and 306).

According to exemplary aspects of the present disclosure, as content item 308 is being played back to the user, playback metrics may be continuously monitored and processed to facilitate an improved playback experience for remaining content times 302, 304, and 306. Accordingly, as shown in FIG. 3C, as the playback parameters and metrics are processed (e.g., time to play, bandwidth, network type, processor usage, memory usage, battery status, length/size of the content items, etc.) the overall playback scores may be updated such that the order in which content items 302, 304, and 306 are arranged (and played back) may also be continuously and dynamically adjusted. However, the order of content items 301, 303, 305, and 307 may remain the same as the order in which they are presented in FIGS. 3A and 3B (as they are static content items that may be presented in accordance with the rankings and/or scores determined by the online service).

As shown in FIG. 3C, as content item 308 is being played, the overall playback scores associated with content items 302, 304, and 306 may be updated, based on the continuous monitoring and processing of the playback parameters and metrics, such that the arrangement and presented order of content items 302, 304, and 306 may also be updated. Compared to user interface shown in FIG. 3B, as shown in FIG. 3C, content item 306 (rather than content item 304) is ordered and positioned to be played back after content item 308, followed by content item 304 (rather than content item 302), followed by content item 302 (rather than content item 306). The remaining content items may be continuously and dynamically monitored to facilitate an improved video playback experience for the user.

Figure 4A:
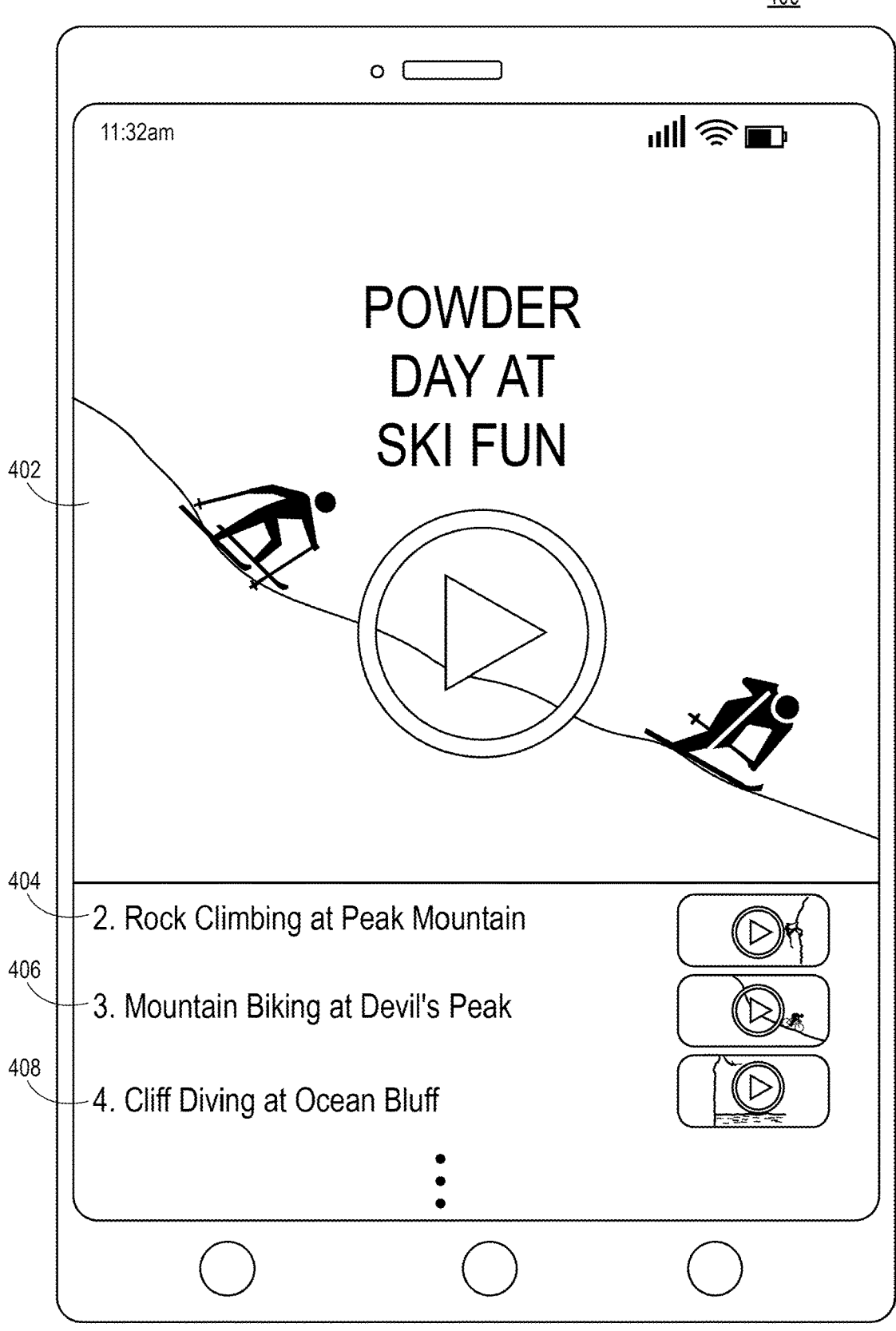
FIGS. 4A-4C are illustrations of exemplary user interfaces that may be presented on a client device, according to exemplary embodiments of the present disclosure.
Figure 4B:
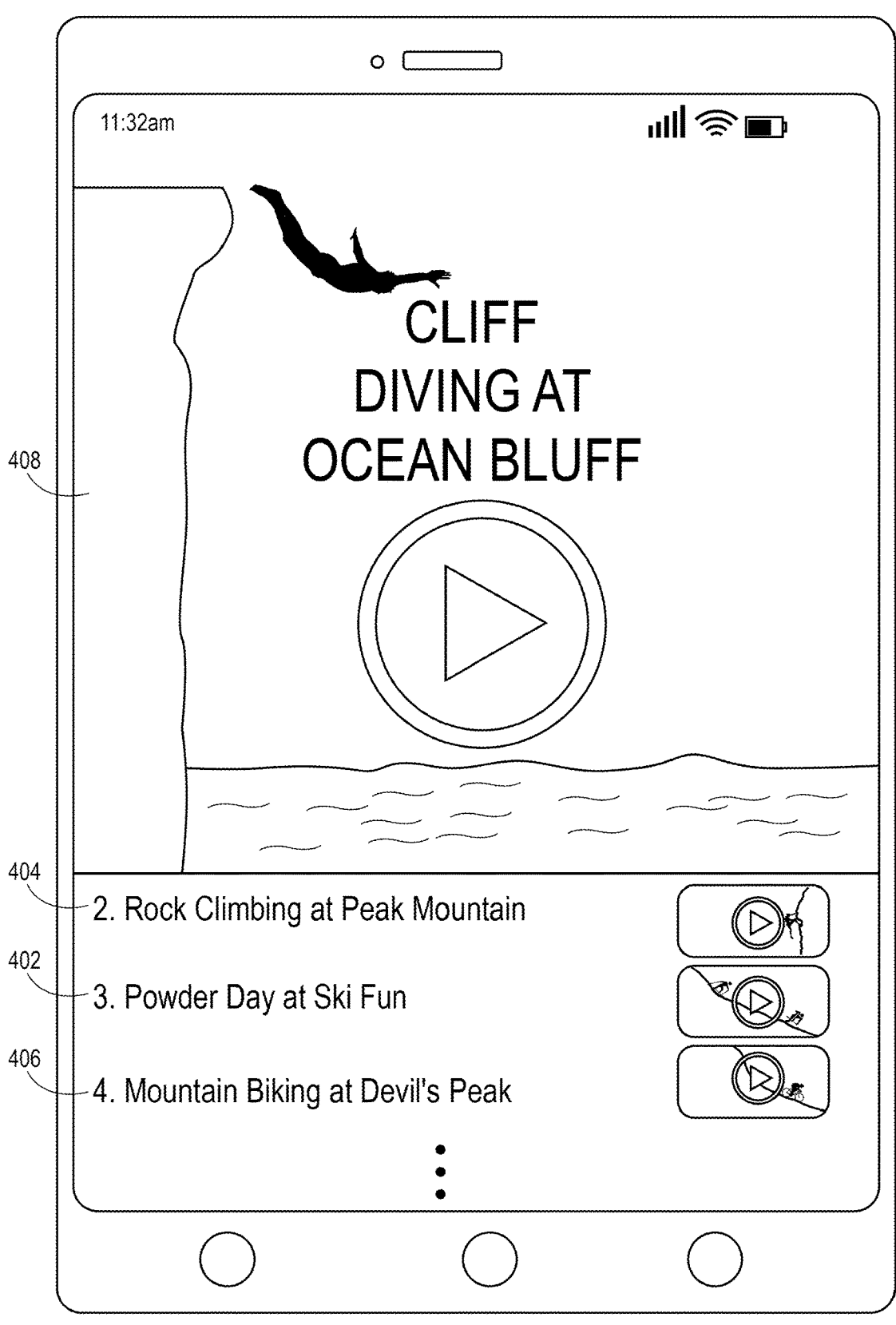
Figure 4C:
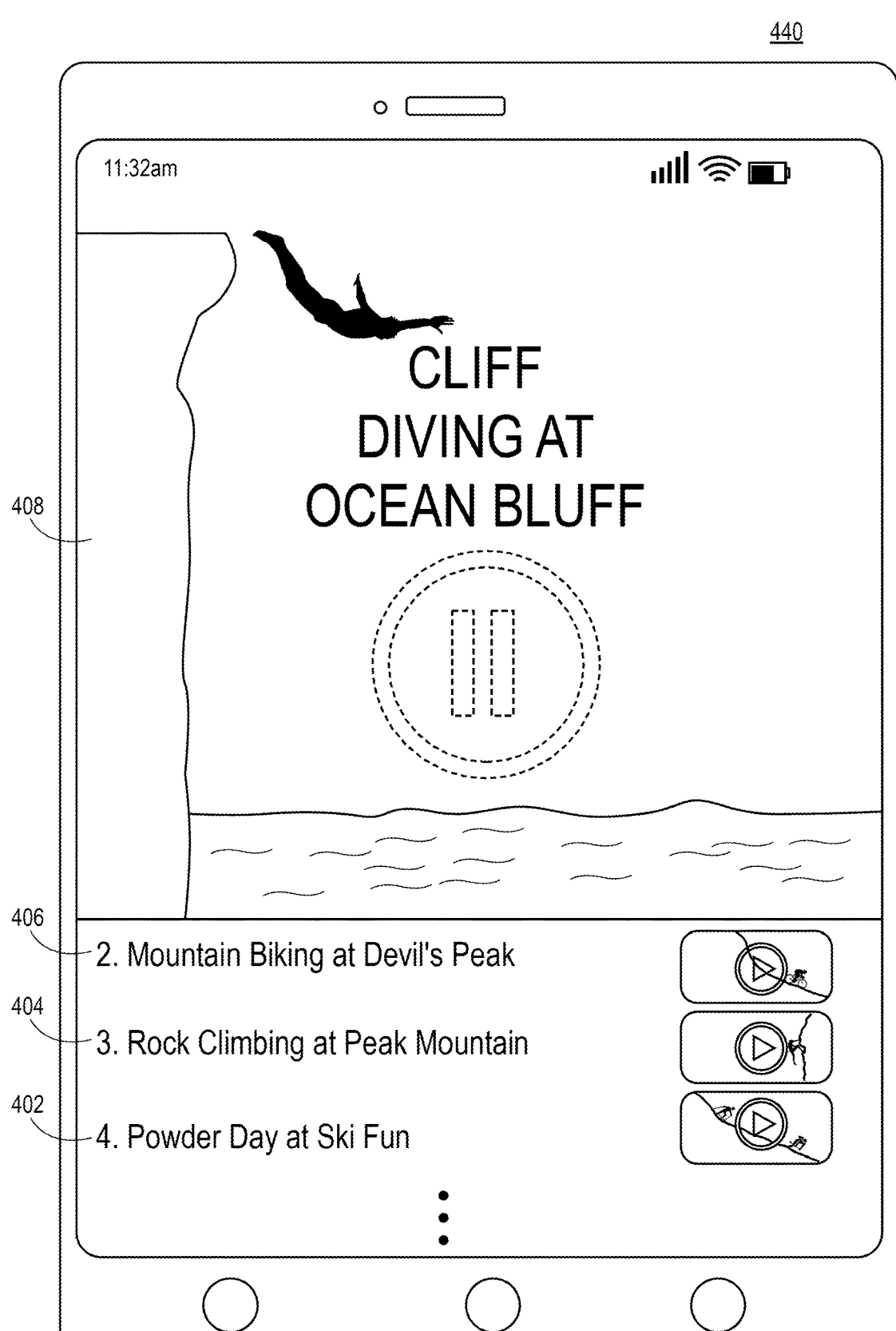

FIGS. 4A-4C are illustrations of exemplary user interfaces that may be presented on a client device, according to exemplary embodiments of the present disclosure.

FIG. 4A is an illustration of exemplary user interface 400 presented on a display of a client device (e.g., client device 102, 104, 106, and/or 210) displaying one or more content items 402, 404, 406, and 408. As shown in FIG. 4A, content items 402, 404, 406, and 408 may be presented on a display of a client device in response to a request for content items and/or a determination that content items are to be provided (e.g., pushed) to a client device. For example, user interface 400 may be presented on the client device in response to a search or query, as part of a home page feed, a determination that content items are to be provided (e.g., pushed) to a client device, and the like. Content items 402, 404, 406, and 408 may have been determined and identified from a corpus of content items by an online service (e.g., online service 110 and/or 240) in response to a request for content items and/or a determination that content items are to be provided (e.g., pushed) to a client device.

In the exemplary implementation illustrated in FIG. 4A, the client device may launch, execute, and/or operate an application facilitating access to an online service. Accordingly, a request for content items may have been sent to the online service (e.g., as part of a query, as part of a request to display a home page, and the like). In response to the request for content items and/or a determination that content items are to be provided (e.g., pushed) to a client device, the online service may have determined and identified content items 402, 404, 406, and 408 (e.g., from a corpus of content items) that are responsive to the request. For example, the online service may include a search and/or recommendation service, which may employ one or more machine learning models, which may be trained and/or configured to identify and/or determine content items from a corpus of content items in response to any such request for content items and/or determination that content items are to be provided (e.g., pushed) to a client device.

In addition to identifying/determining relevant content items and/or as part of identifying/determining relevant content items, the online service may determine scores and/or rankings for each of content items 402, 404, 406, and 408. For example, the online service may determine, based on an expected relevance, user engagement, and the like, rankings and/or scores for content items 402, 404, 406, and 408. The rankings and/or scores may be associated with each respective content item 402, 404, 406, and 408, and the identified content items may be determined based on the processing of embedding vectors which may be representative of and associated with respective content items of the corpus of content items. According to certain aspects, user interface 400 shown in FIG. 4A may illustrate an implementation where content items 402, 404, 406, and 408 are presented in accordance with the rankings and/or scores determined by the online service. As shown in FIG. 4A, content item 402 may be presented in nearly a full screen, and content items 404, 406, and 408 may be presented in a list, queue, etc. with thumbnails, and the like. Alternatively, content item 402 may be presented in entirely as a full-screen, and content items 404, 406, and 408 may not be presented, or presented via an interaction with user interface 400 (e.g., hovering, long tap, etc.).

Additionally, each of content items 402, 404, 406, and 408 may include certain content item metadata and/or information, such as a content item type, a video frame rate, a video resolution, a video length, a video compression, a source/location identifier, and the like. Accordingly, the content item metadata and/or information associated with each content item 402, 404, 406, and 408 may specify certain parameters and/or characteristics that may affect a playback experience associated with the content item.

In addition to the content item metadata and/or information, information associated with the client device on which content items 402, 404, 406, and 408 may be played back may also be obtained. The client device information may include, for example, information such as a type of device, an operating system of the device, a processor type of the device, a processor usage, a memory usage, a connection type (e.g., gigabit ethernet, 3G, LTE, 5G, etc.), a battery status, and the like. The content item information and the client device information may collectively be referred to as playback parameters.

According to exemplary implementations of the present disclosure, the playback parameters associated with content items 402, 404, 406, and 408 and the client device on which content items 402, 404, 406, and 408 may be played back may be processed to determine a playability score for each content item 402, 404, 406, and 408. For example, the network type, available bandwidth, processing power, memory usage, battery status, a content item type, a video frame rate, a video resolution, a video length, a video compression, a source/location identifier, and the like, may be processed to determine relative playability scores for each of the identified content items. The playability scores may represent a relative quality of the playback experience for each content item 402, 404, 406, and 408 on the client device in view of the various playback parameters. The playability scores may be aggregated (e.g., as a normalized weight, etc.) with the relevance and/or user engagement scores associated with content items 402, 404, 406, and 408 (and determined by the online service) to determine an overall playback score for each content item 402, 404, 406, and 408.

Accordingly, in the exemplary implementation illustrated in FIG. 4A, content items 402, 404, 406, and 408 may be ordered and presented in user interface 400 in accordance with the overall playback scores. The order in which content items 402, 404, 406, and 408 are presented to a user on the client device may specify an order in which content items 402, 404, 406, and 408 may be played back to the user. As shown in FIG. 4A, content item 402 may be associated with the highest relative overall playback score, and therefore may be presented as a full-screen (or nearly full-screen). After content item 402, content item 404 may have the next highest score, and therefore positioned at the top of the list/queue presented at the bottom of user interface 400, and so on. Alternatively, content items 402, 404, 406, and 408 may also be presented in other formats (e.g., an ordered list, etc.) in accordance with the overall playback scores.

According to exemplary implementations, the quality of the playback experience may consider, for example, time to load, video quality of the content item, anticipated buffering delays, and the like, with the goal of providing an improved video playback experience to the user (e.g., reduce delays in loading, ensure high quality video playback, etc.). Accordingly, the playback parameters may be processed to ensure an improved video playback experience to the user.

As noted above, FIG. 4A may illustrate an exemplary implementation where the online service had scored and/or ranked content items 402, 404, 406, and 408 such that content item 402 had the highest relative relevance and/or user engagement score, followed by content item 404, followed by content item 406, and followed by content item 408. In exemplary implementations where FIG. 4A represents content items 402, 404, 406, and 408 being presented in accordance of overall playback scores, FIG. 4A may illustrate an implementation where processing of the playback parameters associated with content items 402, 404, 406, and 408 resulted in a comparable playback experience for each of content items 402, 404, 406, and 408 (e.g., the network is fast, the client device has ample battery power, processing power, and the like), thereby resulting in similar playability scores such that the order of playback may be substantially the same as the relevance and/or user engagement scores/rankings determined by the online service.

FIG. 4B is an illustration of exemplary user interface 420 presented on a display of a client device (e.g., client device 102, 104, 106, and/or 210) presenting one or more content items 402, 404, 406, and 408. User interface 420 shown in FIG. 4B is substantially similar to user interface 400 shown in FIG. 4A and also illustrates user interface 420 presenting content items 402, 404, 406, and 408 on a display of a client device in response to a request for content items. For example, user interface 420 may be presented on the client device in response to a search or query, as part of a home page feed, a determination to provide content items (e.g., push) to a client device, and the like. Accordingly, content items 402, 404, 406, and 408 may have been determined and identified from a corpus of content items by an online service (e.g., online service 110 and/or 240).

However, compared to the implementation shown in FIG. 4A, in the exemplary implementation illustrated in FIG. 4B, the order and presentation of content items 402, 404, 406, and 408 may be different, thereby specifying a different order in which content items 402, 404, 406, and 408 may be played back to the user based on the overall playback scores determined for content items 402, 404, 406, and 408. As shown in FIG. 4B, content item 408 may be associated with the highest relative overall playback score, and therefore may be presented in a full-screen (or substantially full-screen) format. After content item 408, content item 404 may have the next highest score, and therefore positioned at the top of the list/queue presented at the bottom of user interface 420, which may correspond to the second position, and so on.

Compared to the implementation illustrated in FIG. 4A, FIG. 4B may illustrate an exemplary implementation where the playback parameters indicate that playing back content items 402, 404, 406, and 408 in the arranged, presented order in user interface 420 (e.g., content item 408, followed by content item 404, followed by content item 402, followed by content item 406) may improve the playback experience for the user. Continuing the example described in connection with FIG. 4A where the online service had scored and/or ranked content items 402, 404, 406, and 408 such that content item 402 had the highest relative relevance and/or user engagement score, followed by content item 404, followed by content item 406, and followed by content item 408, as shown in FIG. 4B, user interface 420 presents content item 408 first, followed by content item 404, followed by content item 402, followed by content item 406, which is not the same order as the scores and/or rankings determined by the online service. Accordingly, the exemplary implementation illustrated in FIG. 4B may include a scenario where processing of the playback parameters results in playability scores that yields a different ordering of content items 402, 404, 406, and 408, i.e., where the highest overall playback score is associated with content item 408, followed by content item 404, followed by content item 402, followed by content item 406. For example, it may have been determined that content item 408 may have the fastest time to play in view of the playback parameters, and the like, while still considering the relevance and/or user engagement scores determined by the online service.

FIG. 4C is an illustration of exemplary user interface 440 presented on a display of a client device (e.g., client device 102, 104, 106, and/or 210) presenting one or more content items 402, 404, 406, and 408. User interface 440 illustrated in FIG. 4C may display a point in time after user interface 420 shown in FIG. 4B. Accordingly, FIG. 4C illustrates an exemplary implementation where content item 408 is currently being played back to the user (as indicated by the "pause" symbol rather than the "play" symbol included in content items 402, 404, and 406).

According to exemplary aspects of the present disclosure, as content item 408 is being played back to the user, playback metrics may be continuously monitored and processed to facilitate an improved playback experience for remaining content times 402, 404, and 406. Accordingly, as shown in FIG. 4C, as the playback parameters and metrics are processed (e.g., time to play, bandwidth, network type, processor usage, memory usage, battery status, length/size of the content items, etc.) the overall playback scores may be updated such that the order in which content items 402, 404, and 406 are arranged (and played back) may also be continuously and dynamically adjusted.

As shown in FIG. 4C, as content item 408 is being played, the overall playback scores associated with content items 402, 404, and 406 may be updated, based on the continuous monitoring and processing of the playback parameters and metrics, such that the arrangement and presented order of content items 402, 404, and 406 may also be updated. Compared to user interface shown in FIG. 4B, as shown in FIG. 4C, content item 406 (rather than content item 404) is ordered and positioned to be played back after content item 408, followed by content item 404 (rather than content item 402), followed by content item 402 (rather than content item 406). The remaining content items may be continuously and dynamically monitored to facilitate an improved video playback experience for the user.

Figure 5:
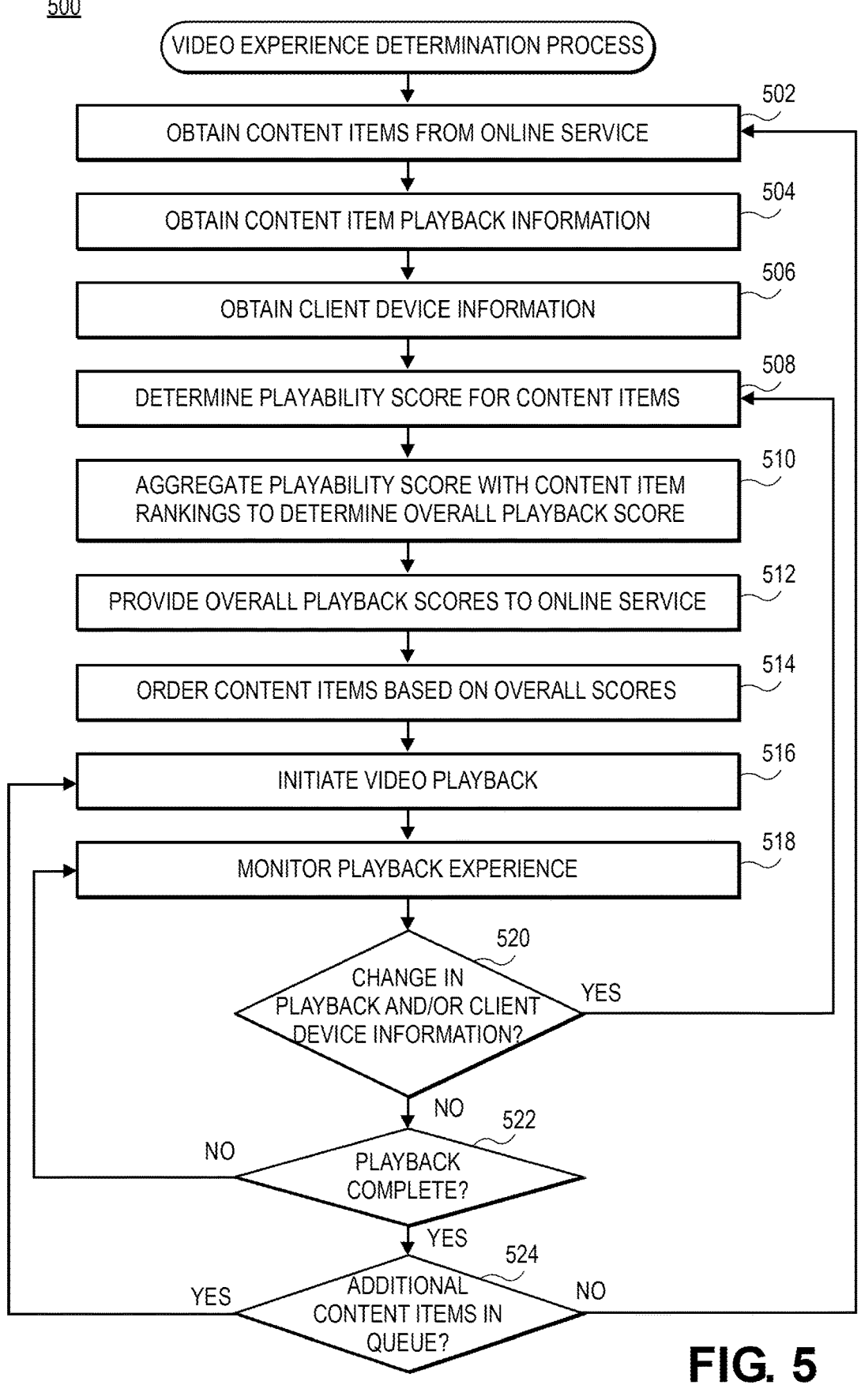
FIG. 5 is a flow diagram of an exemplary video experience determination process, according to exemplary embodiments of the present disclosure.

FIG. 5 is a flow diagram of an exemplary video experience determination process 500, according to exemplary embodiments of the present disclosure. FIG. 5 may illustrate an exemplary video determination process 500 that may be performed by a client device (e.g., client device 102, 104, and/or 106) in obtaining and playing back video content items from an online service (e.g., online service 110).

As shown in FIG. 5, process 500 may begin at step 502, where content items may be obtained (e.g., by a client device) from an online service. The content items may have been determined and/or identified by the online service in response to a request for content items and/or a determination that content items are to be provided (e.g., pushed) to a client device. For example, the request for content items may have been associated with a search or query, accessing a home page, and the like. The online service may have employed one or more trained machine learning models to determine, identify, score, and/or rank the content items from a corpus of content items based on a relevance, expected user engagement, etc. of the content items in connection with the request and/or the determination that content items are to be provided (e.g., pushed) to a client device. Further, the content items may be ranked, scored, and/or ordered in accordance with the determinations made by the online service.

In step 504, content item playback information associated with the content items may be obtained. The content item playback information may include metadata and information associated with the content items, such as the determined scores and/or rankings, a content item type, a video frame rate, a video resolution, a video length, a video compression, a source/location identifier, and the like. In addition to the content item information, information associated with the client device may also be obtained, as in step 506. The client device information may include, for example, information such as a type of device, an operating system of the device, a processor type of the device, a processor usage, a memory usage, a connection type (e.g., gigabit ethernet, 3G, LTE, 5G, etc.), a battery status, and the like.

The playback information and the content device information may be used to determine a playability score for each content item, as in step 508. For example, the network type, available bandwidth, processing power, memory usage, battery status, a content item type, a video frame rate, a video resolution, a video length, a video compression, a source/location identifier, and the like, may be processed to determine the playability scores for each of the identified content items. The playability scores may represent a relative quality of the playback experience for each content item on the client device in view of the various playback parameters (e.g., quality of playback, time until available to play, buffering, etc.). In step 510, the playability score may be aggregated with the ranking and/or scores determined by the online service (e.g., as a normalized weight to the relevance and/or user engagement scores, etc.) to determine an overall playback score for each content item.

According to exemplary implementations, the quality of the playback experience may consider, for example, time to load, video quality of the content item, anticipated buffering delays, and the like, with the goal of providing an improved video playback experience to the user (e.g., reduce delays in loading, ensure high quality video playback, etc.). Accordingly, the playback parameters may be processed to ensure an improved video playback experience to the user. For example, if the playback parameters indicate that the network type is a slower network with limited bandwidth, a smaller, lower resolution, and/or shorter video content item may be assigned a higher relative playability score. In another example, if the playback parameters indicate that the network is fast and loading and playback of each of the content items would be comparable, each of the content items may be assigned a similar playability score such that the order of playback may be substantially in accordance with the rankings, order, relevance and/or user engagement scores, etc. determined by the online service. By way of another example, a higher relative playability score may be assigned to content items that are obtained from a content delivery network (CDN) that may have faster transmission speeds, be geographically closer to the respective client device, and the like. According to an aspect of the present disclosure, if processing of the playback parameters indicates that a certain content item may be substantially unplayable (e.g., a playability score under a threshold value, etc.), the content item in question may be removed from the identified content items such that the user does not experience playback difficulties with the content item in question. Embodiments of the present disclosure may employ, for example, a probabilistic model, a rule-based algorithm, a trained machine learning system, or any combination thereof, in determining the playability scores for each of the content items.

Optionally, the overall playback scores (and/or the playback information, client device information, and the like) may be provided to the online service, as in step 512. The overall playback scores may be provided to the online service to be used as a further input and/or training input data for one or more machine learning models that may be employed by the online service to determine and/or identify content items from the corpus of content items in response to a query, request for content items, a determination that content items are to be provided (e.g., pushed) to a client device, and like, from one or more client devices. Accordingly, the online service may consider the overall playback scores in determining the rankings, scores, order, and/or relevance/user engagement for content items in response to a request for content items and/or a determination that content items are to be provided (e.g., pushed) to a client device.

In step 514, the content items may be ordered and presented to a user on the client device in a queue based on the overall playback scores, such that the content item with the highest relative overall playback score may be presented and/or played first. The ordering of the content items can facilitate an improved playback experience to the user by prioritizing content items that may deliver an improved video playback experience based on the real-time information and parameters associated with the content items and the client device, even as a user may quickly scroll through the video content items. After the content items have been ordered in accordance with the overall playback scores, video playback of the first content item may be initiated, as in step 516. According to certain aspects, playback of the first content item (e.g., the content item with the highest relative overall playback score) may be automatically initiated. Playback may also be initiated via an interaction, by the user, with a user interface presenting the content items.

Additionally, according to exemplary implementations of the present disclosure, as in step 518, the playback parameters, as well as certain playback metrics, may be continuously monitored during playback of the content items and after the playability scores were initially determined for the content items. The playback metrics may include, for example, a time to load and/or initiate playback, an error rate associated with the content items, and the like. Accordingly, the playback metrics and playback parameters may be further processed during playback of the content items to facilitate continuous and dynamic updating, adjustment, and/or modification of the overall playback scores for the remaining content items that have not yet been played.

Based on the monitoring of the play back experience, in step 520, it may be determined if the playback information and/or client device information has changed, such that the order of the remaining content items should be re-ordered and/or reranked. If the playback information and/or client device information has changed, process 500 can return to step 508 so that updated playability scores can be determined. If the playback information and/or client device information has not changed, it can be determined in step 522 whether playback of the video content item is complete. If playback of the video content item has not yet been completed, the playback experience is continuously monitored, as in step 518. If playback has completed, it is determined whether additional content items remain for playback. If additional content items remain, in step 516, playback of the next content item is initiated. If additional content items do not remain, process 500 may return to step 502 to obtain additional content items.

Figure 6:
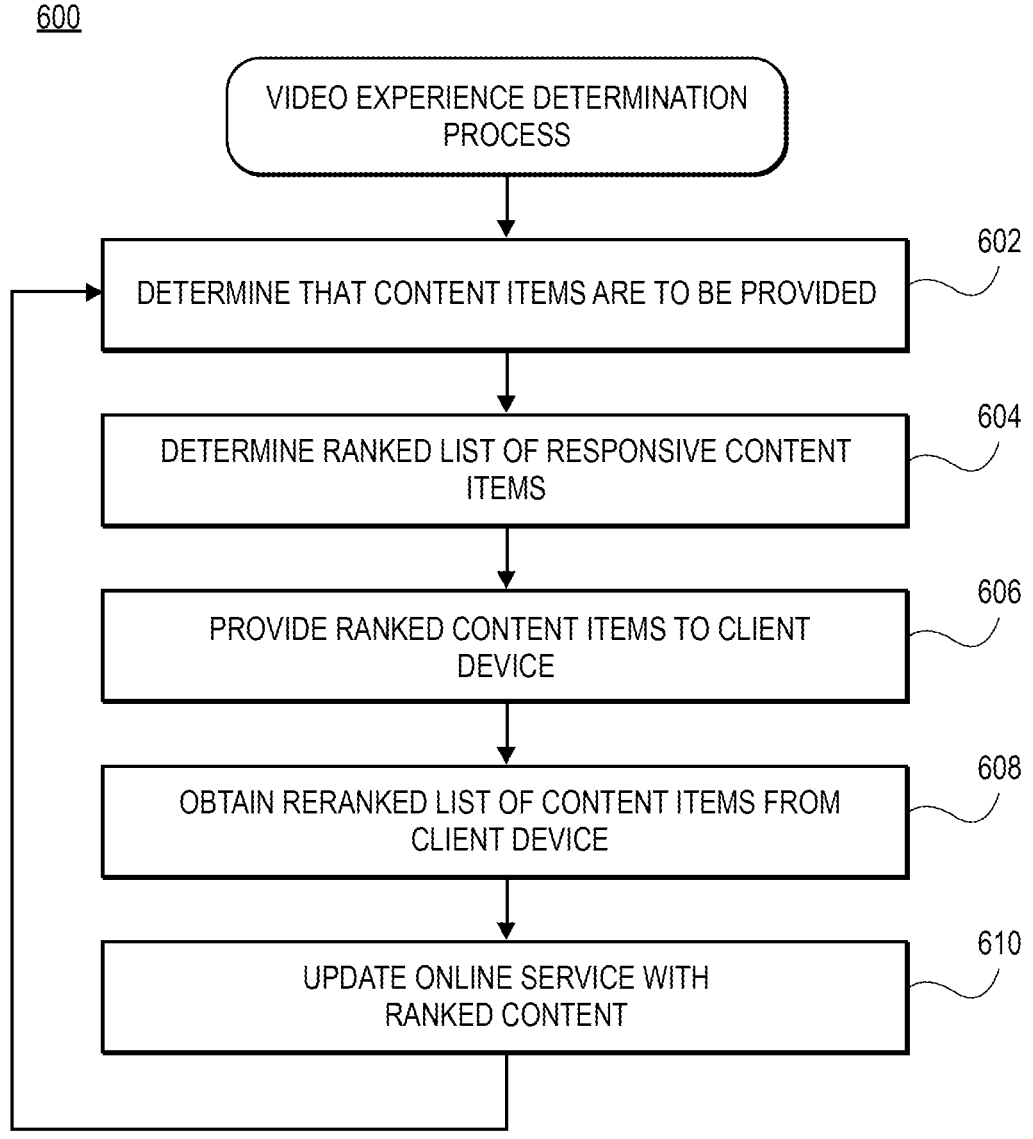
FIG. 6 is a flow diagram of an exemplary video experience determination process, according to exemplary embodiments of the present disclosure.

FIG. 6 is a flow diagram of an exemplary video experience determination process 600, according to exemplary embodiments of the present disclosure. FIG. 6 may illustrate an exemplary video determination process 600 that may be performed by an online service (e.g., online service 110) in determining and providing content items to a client device (e.g., client device 102, 104, and/or 106) in response to a request for content items and/or a determination that content items are to be provided (e.g., pushed) to a client device.

As shown in FIG. 6, process 600 may begin at step 602 with a determination that content items are to be provided to a client device. The determination may be made, for example, in response to a request for content items and/or a determination of an online service to push content items to the client devices. The request for content items may, for example, be received from a client device in connection with a search or query, accessing a home page and/or feed, and the like. Further, the determination to push content items may be determined based on activity of the user associated with the client device (e.g., identifying related and/or recommended content items), after a period of time has elapsed, etc. In response to the determination that content items are to be provided, the one or more trained machine learning models may be utilized to determine, identify, score, and/or rank content items from a corpus of content items, as in step 604. For example, the content items may be determined, identified, scored, and/or ranked based on embedding vectors associated with the content items, which may be representative of and associated with respective content items of a corpus of content items.

According to certain exemplary implementations, an LSH technique can be used to project embedding vectors associated with content items of the corpus of content items into an embedding space and divide the corpus into a plurality of regions or "buckets." The request for content items (e.g., the query, the user's interests/profile, etc.) can also be represented as an embedding vector, which can be mapped to one or more of the buckets, which generally may include the content times that are most likely to be similar to the request for content items, as determined by their projected proximity in the multi-item embedding space (e.g., cosine similarity, etc.). Accordingly, the determination, identification, scores, rankings, and the like may be based on the similarity of the projected embedding vectors. The determined, identified, scored, and/or ranked content items may then be provided to the client device in response to the request for content items and/or a determination that content items are to be provided (e.g., pushed) to a client device, as in step 606.

In step 608, a reranked list of the content items may be obtained from the client device. This may include, for example, playability scores, overall playback scores, rankings and/or an order based on the playability scores and/or the overall playback scores and the like. The playability scores and the overall playback scores may represent a relative quality of the playback experience for each content item on the client device in view of the various playback parameters (e.g., quality of playback, time until available to play, buffering, etc.).

In step 610, the online service may be updated based on the playability scores, overall playback scores, rankings and/or an order based on the playability scores and/or the overall playback scores, etc. obtained in step 608. For example, the playability scores, overall playback scores, rankings and/or an order based on the playability scores, etc. can be used as a further input and/or training input data for one or more machine learning models that may be employed by the online service in determining, identifying, ranking, scoring, and/or otherwise determining content items from a corpus of content items in response to a request for content items from one or more of client devices and/or a determination that content items are to be provided (e.g., pushed) to a client device so as to update the one or more machine learning models and/or the online service, as in step 610. Accordingly, the playback metrics, the playback parameters, playability scores, and/or the overall playback scores may be considered in determining the rankings and/or relevance/user engagement scores for the identified content items in response to a request for content items and/or a determination that content items are to be provided (e.g., pushed) to a client device.

Figure 7:
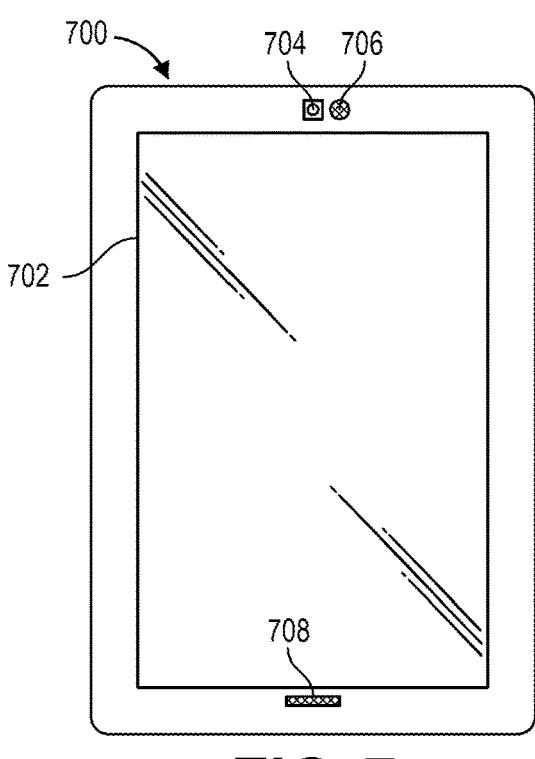
FIG. 7 is an illustration of an exemplary client device, according to exemplary embodiments of the present disclosure.

FIG. 7 illustrates an exemplary client device 700 that can be used in accordance with various implementations described herein. In this example, client device 700 includes display 702 and optionally at least one input component 704, such as a camera, on a same side and/or opposite side of the device as display 702. Client device 700 may also include an audio transducer, such as speaker 706, and microphone 708. Generally, client device 700 may have any form of input/output components that allow a user to interact with client device 700. For example, the various input components for enabling user interaction with the device may include touch-based display 702 (e.g., resistive, capacitive, Interpolating Force-Sensitive Resistance (IFSR)), a camera (for gesture tracking, etc.), a microphone, a global positioning system (GPS), a compass or any combination thereof. One or more of these input components may be included on a user device or otherwise in communication with the user device. Various other input components and combinations of input components can be used as well within the scope of the various implementations, as should be apparent in light of the teachings and suggestions contained herein.

Figure 8:
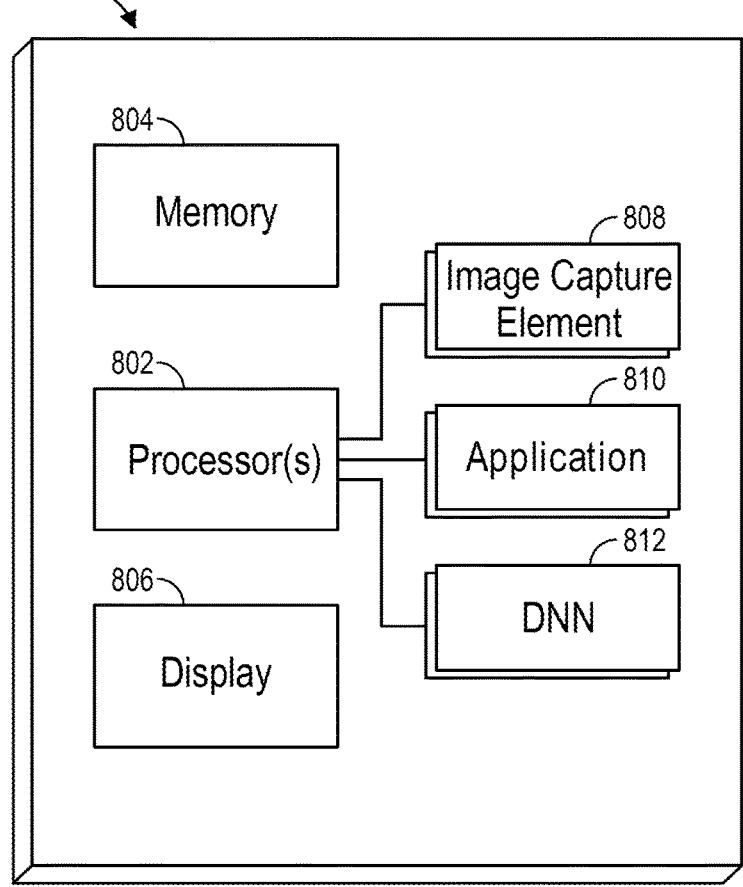
FIG. 8 is an illustration of an exemplary configuration of a client device, such as that illustrated in FIG. 7, according to exemplary embodiments of the present disclosure.

In order to provide the various functionality described herein, FIG. 8 illustrates an exemplary set of components 800 of client device 700, such as client device 700 described with respect to FIG. 7 and discussed herein. In this example, the device includes at least one central processor 802 for executing instructions that can be stored in at least one memory device or element 804. As would be apparent to one of ordinary skill in the art, the device can include many types of memory, data storage or computer-readable storage media, such as a first data storage for program instruction for execution by the one or more processors 802. Removable storage memory can be available for sharing information with other devices, etc. The device typically will include some type of display 806, such as a touch-based display, electronic ink (e-ink), organic light emitting diode (OLED), liquid crystal display (LCD), etc.

As discussed, the device in many implementations will include at least one image capture element 808, such as one or more cameras that are able to image objects in the vicinity of the device. An image capture element can include, or be based at least in part upon, any appropriate technology, such as a CCD or CMOS image capture element having a determined resolution, focal range, viewable area, and capture rate. The device can include at least one application component 810 for performing the implementations discussed herein. Optionally, the device can include trained DNN 812 (or other machine learning model), which can be configured to determine playability scores and/or overall playback scores, according to the implementations described herein. The user device may be in constant or intermittent communication with one or more remote computing resources and may exchange information, such as livestream feeds, chat messages, etc., with the remote computing system(s) as part of the disclosed implementations.

The device also can include at least one location component, such as GPS, NFC location tracking, Wi-Fi location monitoring, etc. The example client may also include at least one additional input device able to receive conventional input from a user. This conventional input can include, for example, a push button, touch pad, touch-based display, wheel, joystick, keyboard, mouse, trackball, keypad or any other such device or element whereby a user can submit an input to the device. These I/O devices could be connected by a wireless, infrared, Bluetooth, or other link as well in some implementations. In some implementations, however, such a device might not include any buttons at all and might be controlled only through touch inputs (e.g., touch-based display), audio inputs (e.g., spoken), or a combination thereof.

Figure 9:
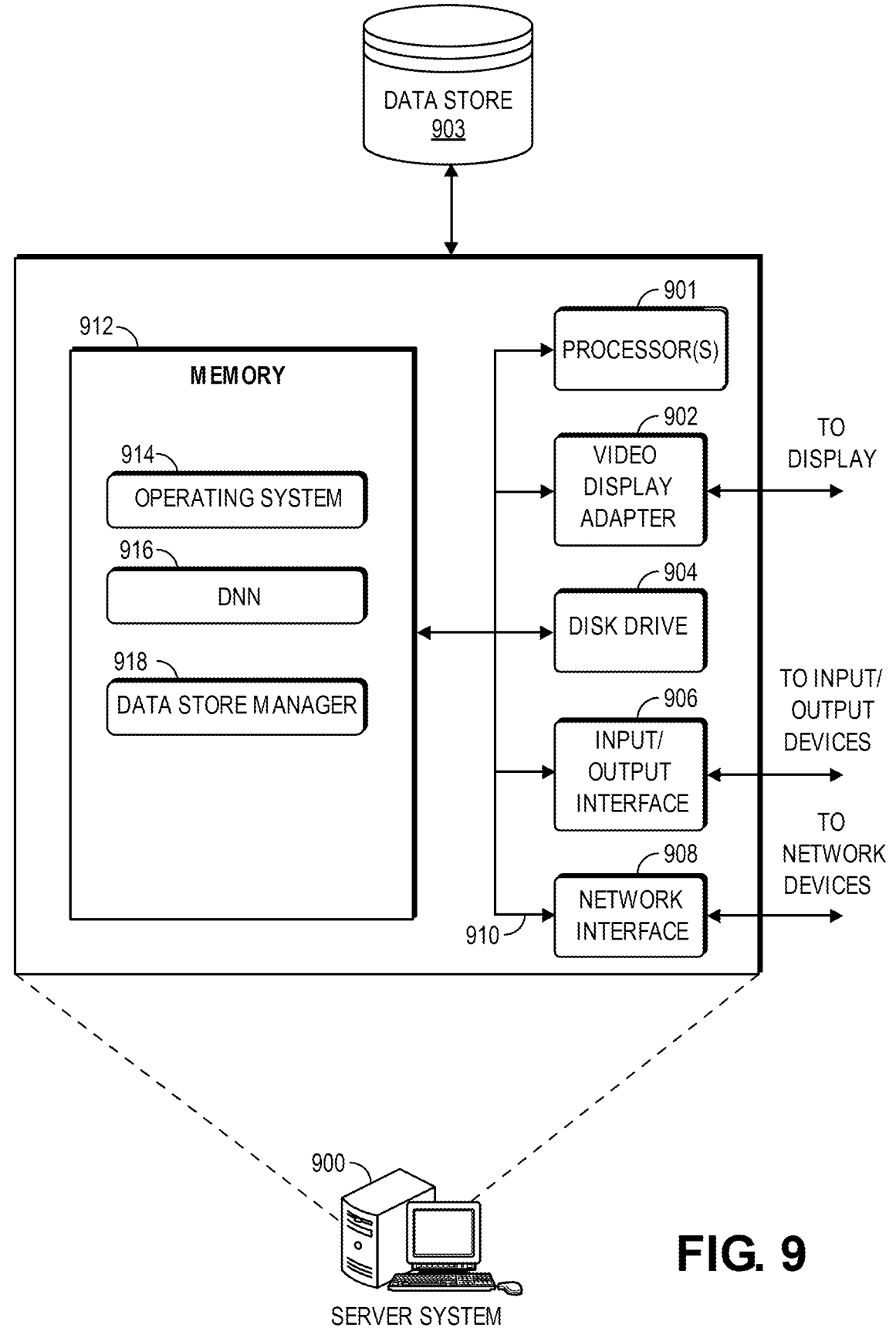
FIG. 9 is an illustration of an exemplary server system, according to exemplary embodiments of the present disclosure.

FIG. 9 is a pictorial diagram of an illustrative implementation of a server system 900 that may be used with one or more of the implementations described herein. For example, online service 110 and/or 240 may operate and/or execute on a computing resource, such as server system 900. Server system 900 may include one or more processors 901, such as one or more redundant processors, video display adapter 902, disk drive 904, input/output interface 906, network interface 908, and memory 912. Processor(s) 901, video display adapter 902, disk drive 904, input/output interface 906, network interface 908, and memory 912 may be communicatively coupled to each other by communication bus 910.

Video display adapter 902 provides display signals to a local display, permitting an operator of server system 900 to monitor and configure operation of server system 900. Input/output interface 906 likewise communicates with external input/output devices not shown in FIG. 9, such as a mouse, keyboard, scanner, or other input and output devices that can be operated by an operator of server system 900. Network interface 908 includes hardware, software, or any combination thereof, to communicate with other computing devices. For example, network interface 908 may be configured to provide communications between server system 900 and other computing devices, such as client device 700.

Memory 912 generally comprises random access memory (RAM), read-only memory (ROM), flash memory, and/or other volatile or permanent memory. Memory 912 is shown storing operating system 914 for controlling the operation of server system 900. Server system 900 may also include trained DNN 916 (or other machine learning model), as discussed herein. In some implementations, trained DNN 916 may determine content items to be provided to a client device. In other implementations, trained DNN 916 may exist on both server system 900 and/or each client device (e.g., DNN 812).

Memory 912 additionally stores program code and data for providing network services that allow client devices and external sources to exchange information and data files with server system 900. Memory 912 may also include trained DNN 916, which may communicate with data store manager application 918 to facilitate data exchange and mapping between the data store 903 (e.g., which may store and maintain a corpus of content items), user/client devices, such as client devices 102, 104, and/or 106, external sources, etc.

As used herein, the term "data store" refers to any device or combination of devices capable of storing, accessing and retrieving data, which may include any combination and number of data servers, databases, data storage devices and data storage media, in any standard, distributed or clustered environment. Server system 900 can include any appropriate hardware and software for integrating with the data store 903 as needed to execute aspects of one or more applications for the client device 700, the external sources, etc.

Data store 903 can include several separate data tables, databases or other data storage mechanisms and media for storing data relating to a particular aspect. For example, data store 903, as illustrated, includes digital items (e.g., images, videos, etc.) and corresponding metadata (e.g., image segments, popularity, source) about those items.

It should be understood that there can be many other aspects that may be stored in data store 903, which can be stored in any of the above listed mechanisms, as appropriate, or in additional mechanisms of any of the data store. Data store 903 may be operable, through logic associated therewith, to receive instructions from server system 900 and obtain, update or otherwise process data in response thereto.

Server system 900, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction in FIG. 9 should be taken as being illustrative in nature and not limiting to the scope of the disclosure.

Aspects of the disclosed system may be implemented as a computer method or as an article of manufacture, such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, media files, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

Moreover, with respect to the one or more methods or processes of the present disclosure shown or described herein, including but not limited to the flow charts shown in FIGS. 5 and 6, orders in which such methods or processes are presented are not intended to be construed as any limitation on the claims, and any number of the method or process steps or boxes described herein can be combined in any order and/or in parallel to implement the methods or processes described herein. In addition, some process steps or boxes may be optional. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

24

What is claimed is:

1. A computer-implemented method, comprising:
determining that content items are to be provided to a first client device;
determining, based at least in part on the determination that content items are to be provided to the first client device and a first plurality of embedding vectors associated with a corpus of content items, a first plurality of responsive content items from the corpus of content items;
determining, based at least in part on a second plurality of embedding vectors associated with the first plurality of responsive content items, a first relevance score associated with each of the first plurality of responsive content items;
providing, to the first client device, the first plurality of responsive content items;
obtaining, from the first client device, a plurality of playability information associated with the first plurality of responsive content items;
determining that content items are to be provided to at least one of the first client device or a second client device;
determining, based at least in part on the determination that content items are to be provided to at least one of the first client device or the second client device, a third plurality of embedding vectors associated with the corpus of content items, and the plurality of playability information, a second plurality of responsive content items from the corpus of content items;
determining, based at least in part on a fourth plurality of embedding vectors associated with the second plurality of responsive content items and the plurality of playability information, a second relevance score associated with each of the second plurality of responsive content items; and
providing the second plurality of responsive content items in accordance with the second relevance score.

2. The computer-implemented method of claim 1, wherein the second relevance scores are determined using a trained machine learning model, and the plurality of playability information is provided as an input to the trained machine learning model.

3. The computer-implemented method of claim 1, wherein the plurality of playability information includes at least one of:
a size associated the content item;
a frame rate associated the content item;
a resolution associated the content item;
a length of the content item;
a content item type;
a source location identifier;
a client device type;
a processor usage;
a memory usage;
a battery status;
a network connection type;
a video playability score; or
an overall playback score.

4. The computer-implemented method of claim 3, wherein the video playability score represents a quality of a video playback experience.

5. The computer-implemented method of claim 4, wherein the quality of the video playback experience includes a time to start playback.

6. The computer-implemented method of claim 3, wherein the video playability score is based at least in part on a plurality of client device information associated with the first client device.

7. A computing system, comprising:

one or more processors; and one or more memory storing program instructions that, when executed by the one or more processors, cause the one or more processors to perform operations comprising:

determining that content items are to be provided to a first client device;

determining, based at least in part on the determination that content items are to be provided to the first client device and a first plurality of embedding vectors associated with a corpus of content items, a first plurality of responsive content items from the corpus of content items;

determining, based at least in part on a second plurality of embedding vectors associated with the first plurality of responsive content items, a first relevance score associated with each of the first plurality of responsive content items;

providing, to the first client device, the first plurality of responsive content items;

obtaining, from the first client device, a plurality of playability information associated with the first plurality of responsive content items;

determining that content items are to be provided to at least one of the first client device or a second client device;

determining, based at least in part on the determination that content items are to be provided to at least one of the first client device or the second client device, a third plurality of embedding vectors associated with the corpus of content items, and the plurality of playability information, a second plurality of responsive content items from the corpus of content items;

determining, based at least in part on a fourth plurality of embedding vectors associated with the second plurality of responsive content items and the plurality of playability information, a second relevance score associated with each of the second plurality of responsive content items; and providing the second plurality of responsive content items in accordance with the second relevance score.

8. The computing system of claim 7, wherein the second relevance scores are determined using a trained machine learning model, and the plurality of playability information is provided as an input to the trained machine learning model.

9. The computing system of claim 7, wherein the plurality of playability information includes at least one of:

a size associated the content item;

a frame rate associated the content item;

a resolution associated the content item;

a length of the content item;

a content item type;

a source location identifier;

a client device type;

a processor usage;

a memory usage;

a battery status;

a network connection type;

a video playability score; or an overall playback score.

10. The computing system of claim 9, wherein the video playability score represents a quality of a video playback experience.

11. The computing system of claim 10, wherein the quality of the video playback experience includes a time to start playback.

12. The computing system of claim 9, wherein the video playability score is based at least in part on a plurality of client device information associated with the first client device.

13. One or more non-transitory computer readable storage media having instructions that, when executed by one or more computers, cause the one or more computers to perform operations comprising:

determining that content items are to be provided to a first client device;

determining, based at least in part on the determination that content items are to be provided to the first client device and a first plurality of embedding vectors associated with a corpus of content items, a first plurality of responsive content items from the corpus of content items;

determining, based at least in part on a second plurality of embedding vectors associated with the first plurality of responsive content items, a first relevance score associated with each of the first plurality of responsive content items;

providing, to the first client device, the first plurality of responsive content items;

obtaining, from the first client device, a plurality of playability information associated with the first plurality of responsive content items;

determining that content items are to be provided to at least one of the first client device or a second client device;

determining, based at least in part on the determination that content items are to be provided to at least one of the first client device or the second client device, a third plurality of embedding vectors associated with the corpus of content items, and the plurality of playability information, a second plurality of responsive content items from the corpus of content items;

determining, based at least in part on a fourth plurality of embedding vectors associated with the second plurality of responsive content items and the plurality of playability information, a second relevance score associated with each of the second plurality of responsive content items; and providing the second plurality of responsive content items in accordance with the second relevance score.

14. The one or more non-transitory computer readable storage media of claim 13, wherein the second relevance scores are determined using a trained machine learning model, and the plurality of playability information is provided as an input to the trained machine learning model.

15. The one or more non-transitory computer readable storage media of claim 13, wherein the plurality of playability information includes at least one of:

a size associated the content item;

a frame rate associated the content item;

a resolution associated the content item;

a length of the content item;

a content item type;

a source location identifier;

a client device type;

a processor usage;

a memory usage;

a battery status;

a network connection type;

a video playability score; or an overall playback score.

16. The one or more non-transitory computer readable storage media of claim 15, wherein the video playability score represents a quality of a video playback experience.

17. The one or more non-transitory computer readable storage media of claim 16, wherein the quality of the video playback experience includes a time to start playback.

18. The one or more non-transitory computer readable storage media of claim 15, wherein the video playability score is based at least in part on a plurality of client device information associated with the first client device.

* * * * *